US011405115B2

(12) United States Patent
Gimeno-Segovia et al.

(10) Patent No.: US 11,405,115 B2
(45) Date of Patent: Aug. 2, 2022

(54) GENERATION OF ENTANGLED QUBIT STATES

(71) Applicant: PSIQUANTUM CORP., Palo Alto, CA (US)

(72) Inventors: Mercedes Gimeno-Segovia, Palo Alto, CA (US); Terence G. Rudolph, Palo Alto, CA (US)

(73) Assignee: PSIQUANTUM CORP., Palo Alto, CA (US)

( * ) Notice: Subject to any disclaimer, the term of this patent is extended or adjusted under 35 U.S.C. 154(b) by 411 days.

(21) Appl. No.: 16/621,994

(22) PCT Filed: Mar. 22, 2019

(86) PCT No.: PCT/US2019/023756
§ 371 (c)(1),
(2) Date: Dec. 12, 2019

(87) PCT Pub. No.: WO2019/183602
PCT Pub. Date: Sep. 26, 2019

(65) Prior Publication Data
US 2020/0287631 A1 Sep. 10, 2020

Related U.S. Application Data

(60) Provisional application No. 62/647,557, filed on Mar. 23, 2018, provisional application No. 62/715,607, (Continued)

(51) Int. Cl.
*H04B 10/00* (2013.01)
*H04B 10/70* (2013.01)
(Continued)

(52) U.S. Cl.
CPC ............. *H04B 10/70* (2013.01); *G06N 10/00* (2019.01); *H04B 10/614* (2013.01)

(58) Field of Classification Search
CPC ........ H04B 10/70; G06N 10/00; G06N 10/20; G06N 10/40; G06N 10/60; G06N 10/70; G06N 10/80
See application file for complete search history.

(56) References Cited

U.S. PATENT DOCUMENTS 6,437,413 B1   8/2002  Yamaguchi et al.
7,554,080 B2   6/2009  Munro et al.
(Continued)

FOREIGN PATENT DOCUMENTS

WO    WO 2017/189053 A1    11/2017

OTHER PUBLICATIONS

Ying, "Entangled Many-body States as Resources of Quantum Information Processing." Jul. 23, 2013 (Jul. 23, 2013) Retrieved on Jun. 9, 2019 (Jun. 9, 2019) from http://www.nsx0.quantumlah.org/media/thesis/CQT_130723_LiYinq.pdf entire document.
(Continued)

*Primary Examiner* — Daniel G Dobson
(74) *Attorney, Agent, or Firm* — Morgan, Lewis & Bockius LLP

(57) ABSTRACT

A method includes receiving Bell pairs. Photons are obtained in a Greenberger-Horn-Zeilinger (GHZ) state by providing, to a first beam splitter, a photon from a first Bell pair and a photon from a second Bell pair. The first beam splitter is coupled with a first output channel and a second output channel. Obtaining the photons in the GHZ state further includes providing, to a second beam splitter, a photon from a third Bell pair and a photon from a fourth Bell pair. The second beam splitter is coupled with a third output channel arid a fourth output channel. Obtaining the photons in the GHZ state further includes providing a photon output from the second output channel as a first input to a detector and a photon output in the third output channel a second input to the first detector.

34 Claims, 22 Drawing Sheets

Related U.S. Application Data filed on Aug. 7, 2018, provisional application No. 62/770,948, filed on Nov. 21, 2018, provisional application No. 62/770,645, filed on Nov. 21, 2018.

(51) Int. Cl.
*G06N 10/00* (2022.01)
*H04B 10/61* (2013.01)
*H04J 14/00* (2006.01)

(56) References Cited

U.S. PATENT DOCUMENTS

| | | | |
|---|---|---|---|
| 7,667,995 B1 * | 2/2010 | Leuenberger | B82Y 10/00 398/40 |
| 9,178,154 B2 | 11/2015 | Bunyk | |
| 2003/0055513 A1 | 3/2003 | Raussendorf et al. | |
| 2005/0133780 A1 * | 6/2005 | Azuma | B82Y 10/00 257/13 |
| 2007/0252081 A1 | 11/2007 | Munro et al. | |
| 2014/0126030 A1 | 5/2014 | Crespi et al. | |
| 2015/0214984 A1 | 7/2015 | Ahn et al. | |
| 2016/0292586 A1 | 10/2016 | Rigetti et al. | |
| 2017/0061317 A1 | 3/2017 | Chow et al. | |
| 2017/0082494 A1 | 3/2017 | Hughes et al. | |
| 2018/0114138 A1 * | 4/2018 | Monroe | G06F 15/76 |

OTHER PUBLICATIONS

Psiquantum Corp., International Search Report and Written Opinion, PCT/US2019/021241, dated Jul. 2, 2019, 13 pgs.
Fowler, A.G. and Goyal, "Topological cluster state quantum computing." arXiv:0805.3202v2 (quant-ph), available online: Feb. 25, 2009 (Feb. 25, 2009), Fig 1, 1a, section 1, 11 (online) URL https://pdfs.semanticscholar.org/f1d0/5ccb2ad6d3a61e20c0888c49fca3c8a50a4c.pdf.
Psiquantum Corp., International Search Report and Written Opinion, PCT/US2019/21711, dated Jul. 22, 2019, 17 pgs.
Browne, Resource-efficient linear optical quantum computation, QOLS, Blackett Laboratory, Imperial College London, Feb. 9, 2005, 5 pgs.
Pant, Percolation Thresholds for Photonic Quantum, Computing, Cornell University, Quantum Physics, Jan. 13, 2017, 14 pgs.
Gimeno-Segovia, Mercedes, From three-photon GHZ states to ballistic universal quantum computation, Phys. Rev. Lett. 115, 020502, Jul. 16, 2015, https://arxiv.org.abs/1410.3720, 1 pg.
Psiquantum Corp., International Search Report and Written Opinion, PCT/US2019/023756, dated Jul. 29, 2019, 11 pgs.
Kieling, Notice of Allowance, U.S. Appl. No. 16/691,459, dated May 3, 2021, 9 pgs.
Psiquantum Corp., International Preliminary Report on Patentability, PCT/US2019/023756, dated Sep. 29, 2020, 8 pgs.
Psiquantum Corp., International Preliminary Report on Patentability, PCT/US2019/045563, dated Feb. 9, 2021, 9 pgs.
Psiquantum Corp., International Preliminary Report on Patentability, PCT/US2019/021711, dated Sep. 15, 2020, 14 pgs.
Psiquantum Corp., International Preliminary Report on Patentability, PCT/US2019/021241, dated Sep. 8, 2020, 10 pgs.
Psiquantum Corp., International Search Report / Written Opinion, PCT/US2019/045563, dated Oct. 25, 2019, 3 pgs.
Caspani et al. "Integrated Sources of Photon Quantum States Based on Nonlinear Optics." In:Light; Science & Applications 6.11.Nov. 17, 2017 (Nov. 17, 2017) Retrieved on Oct. 7, 2019 (Oct. 7, 2019) from <https://www.nature.com/articles/lsa2017100.pdf> entire document.
Dusek. "Discrimination of the Bell States of Qudits by means of linear optics." In: Optics Communications 199. 1-4, Jul. 23, 2001 (Jul. 23, 2001) Retrieved on Oct. 7, 2019 (Oct. 7, 2019) from <https://arxiv.org/pdf/quant-ph/0107119.pdf> entire document.
Cao et al., "Generation of Atomic Entangled States Using Linear Optics." In: arXiv, Preprint quant-ph/0311086, Nov. 13, 2003 (Nov. 13, 2003) Retrieved on Oct. 7, 2019 (Oct. 7, 2019) from <https://arxiv.org/ftp/quant-ph/papers/0311/0311086.pdf> entire document.
Schon et al. "Sequential Generation of Entangled Multiqubit States." In: Physical Review Letter, Jan. 18, 2005, (Jan. 18, 2005) Retrieved on Oct. 7, 2019, (Oct. 7, 2019) from <https://arxiv.org/pdf/quant-ph/0501096.pdf> entire document.

* cited by examiner

700

702 — Receive a plurality of photon pairs, each photon pair being in a Bell pair state and including a first photon and a second photon that is distinct and separate from the first photon

704 — Provide a first photon of a first photon pair as a first input to a first beam splitter and a first photon of a second photon pair as a second input to the first beam splitter. The first beam splitter is coupled with a first output channel of the first beam splitter and a second output channel of the first beam splitter.

706 — Provide a first photon of a third photon pair as a first input to a second beam splitter and a first photon of a fourth photon pair as a second input to the second beam splitter that is distinct from the first beam splitter. The second beam splitter is coupled with a first output channel of the second beam splitter and a second output channel of the second beam splitter

708 — Provide a photon output from the first beam splitter in the second output channel of the first beam splitter as a first input to a first fusion gate and a photon output from the second beam splitter in the first output channel of the second beam splitter as a second input to the first fusion gate

710 — Detect, using the first fusion gate, a first state of the photon provided as the first input to the first fusion gate and a second state of the photon provided as the second input to the first fusion gate

712 — Determine whether the first state and the second state are indicative of a 6-photon GHZ state

Figure 7A

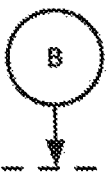

Provide a first photon of a seventh photon pair as a first input to a fourth beam splitter and a first photon of an eighth photon pair as a second input to the fourth beam splitter that is distinct from the first beam splitter, the second beam splitter, and the third beam splitter. The fourth beam splitter is coupled with a first output channel of the fourth beam splitter and a second output channel of the fourth beam splitter. ~722

Provide a photon output from the third beam splitter in the second output channel of the third beam splitter as a first input to a third fusion gate and a photon output from the fourth beam splitter in the first output channel of the fourth beam splitter as a second input to the third fusion gate ~724

Figure 7C

GENERATION OF ENTANGLED QUBIT STATES

CROSS REFERENCE TO RELATED APPLICATIONS

This Application is a United States National Stage Application filed under 35 U.S.C. § 371 of PCT Patent Application Serial No. PCT/US2019/023756 filed on Mar. 22, 2019, which claims the benefit of and priority to U.S. Provisional Application No. 62/647,557, filed Mar. 23, 2018, entitled "Generation Of Entangled Photonic States"; U.S. Provisional Application No. 62/715,607, filed Aug. 7, 2018, entitled "Generation Of Entangled Photonic States"; U.S. Provisional Application No. 62/770,645, filed Nov. 21, 2018, entitled "Generation Of Entangled Photonic States"; and U.S. Provisional Application No. 62/770,648, filed Nov. 21, 2018, entitled "Generation of a Cluster State for Universal Quantum Computing from Bell Pairs", each of which is incorporated by reference herein in its entirety.

TECHNICAL FIELD

This relates generally to quantum technology devices (e.g., hybrid electronic/photonic devices) and, more specifically, to quantum technology devices for generating entangled states of qubits (e.g., entangled states that can be used as resources for quantum computing, quantum communication, quantum metrology, and other quantum information processing tasks).

BACKGROUND

Quantum computers are computers that make use of quantum-mechanical phenomena. In classical computing, information is represented as bits of logical values. Quantum computing, in contrast, makes use of quantum bits (called "qubits"). While the state of a classical bit is constrained to being one of the permitted logical values (e.g., a zero or a one), qubits can make use of the quantum-mechanical phenomenon of superposition, and thereby have a state that is a mixture of logical values. Certain algorithms, such as Shor's prime factorization algorithm, take advantage of superposition and interference to speed up computational tasks. Thus, quantum computing promises a new paradigm of computation where information is processed in a way that has no classical analogue.

One of the main barriers to widespread use of quantum computing is the reliable generation and maintenance of resources. For example, many quantum computing algorithms require clusters of qubits. These qubits need to be in a particular type of superposition, known as an entangled state. However, various problems that either inhibit the generation of entangled states or destroy the entanglement once created (e.g., such as de-coherence) have frustrated advancements in quantum computing. Accordingly, there is a need for methods and devices that generate and maintain entangled states of qubits.

SUMMARY

Some embodiments described herein can use photons as the basis for qubits (e.g., each qubit is encoded in a degree of freedom of a single-photon, such as the single-photon's polarization, or the degrees of freedom of a resource constructed from several single-photons) but other qubit types can be used without departing from the scope of the present disclosure. Using integrated optics, single-photons can be made to have low de-coherence rates, thus solving the problem of maintenance of entangled states once created. However, manipulation of single-photons, such as generation of entangled states based on single-photons, is, in general, a probabilistic process rather than a deterministic one. For example, the probability of generating six photons in a Greenberger-Horn-Zeilinger (GHZ) state has been at most 6.25%. Increasing the probability of generating a cluster of entangled photons is greatly desired.

The above deficiencies and other related problems are reduced or eliminated by the methods and devices described herein for generating entangled qubit states, e.g., for generating entangled photonic qubits states comprised of 2 or more photons. In particular, the embodiments described herein include methods and devices for generating entangled states of photons that have a higher probability of success and use fewer photons as compared with conventional methods and devices for generating entangled qubit states. For example, the methods and devices described herein allow generating six photons in a GHZ state with a probability of 18.75% in some configurations, which is three times the maximum probability previously known. Because generating single-photons is itself a probabilistic process, using fewer photons to generate the same size photonic state leads—by itself—to increased efficiency.

To that end, the present disclosure provides a method of obtaining a plurality of photons in a Greenberger-Horn-Zeilinger (GHZ) state. The method includes receiving a plurality of photon pairs, each photon pair being in a Bell state (e.g., an Einstein-Podolsky-Rosen pair) and including a first photon and a second photon that is distinct and separate from the first photon. The method further includes obtaining a plurality of photons comprising at least six photons in a GHZ state by providing photons of the plurality of photon pairs to a plurality of beam splitters. Providing the photons of the plurality of photon pairs to a plurality of beam splitters includes providing a first photon of a first photon pair as a first input to a first beam splitter and a first photon of a second photon pair as a second input to the first beam splitter. The first beam splitter is coupled with a first output channel of the first beam splitter and a second output channel of the first beam splitter. Providing the photons of the plurality of photon pairs to a plurality of beam splitters further includes providing a first photon of a third photon pair as a first input to a second beam splitter and a first photon of a fourth photon pair as a second input to the second beam splitter that is distinct from the first beam splitter. The second beam splitter is coupled with a first output channel of the second beam splitter and a second output channel of the second beam splitter. The method further includes providing a photon output from the first beam splitter in the second output channel of the first beam splitter as a first input to a first fusion gate and a photon output from the second beam splitter in the first output channel of the second beam splitter as a second input to the first fusion gate.

Further, the present disclosure provides a device for obtaining a plurality of photons in a Greenberger-Horn-Zeilinger (GHZ) state. The device includes a first beam splitter coupled with: a first input channel for the first beam splitter configured for receiving a first photon of a photon pair from a first photon source of a plurality of photon sources; a second input channel for the first beam splitter configured for receiving a first photon of a photon pair from a second photon source of the plurality of photon sources; a first output channel for the first beam splitter, and a second output channel for the first beam splitter. The device further includes a second beam splitter coupled with: a first input channel for the second beam splitter configured for receiving a first photon of a photon pair from a third photon source of the plurality of photon sources; a second input channel for the second beam splitter configured for receiving a first photon of a photon pair from a fourth photon source of the plurality of photon sources; a first output channel for the second beam splitter; and a second output channel for the second beam splitter. The device further includes a first fusion gate coupled with: a first input channel, for the first fusion gate, coupled with the second output channel of the first beam splitter; and a second input channel, for the first fusion gate, coupled with the first output channel of the first beam splitter. The device further includes respective input channels for receiving second photons from: the photon pair from the first photon source, the photon pair from the second photon source, the photon pair from the third photon source, and the photon pair from the fourth photon source. Each respective input channel for receiving a second photon is coupled with a respective output channel.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 7A-7C illustrate a flow chart for a method of generating entangled qubit states, in accordance with some embodiments.

DETAILED DESCRIPTION

Figure 1:
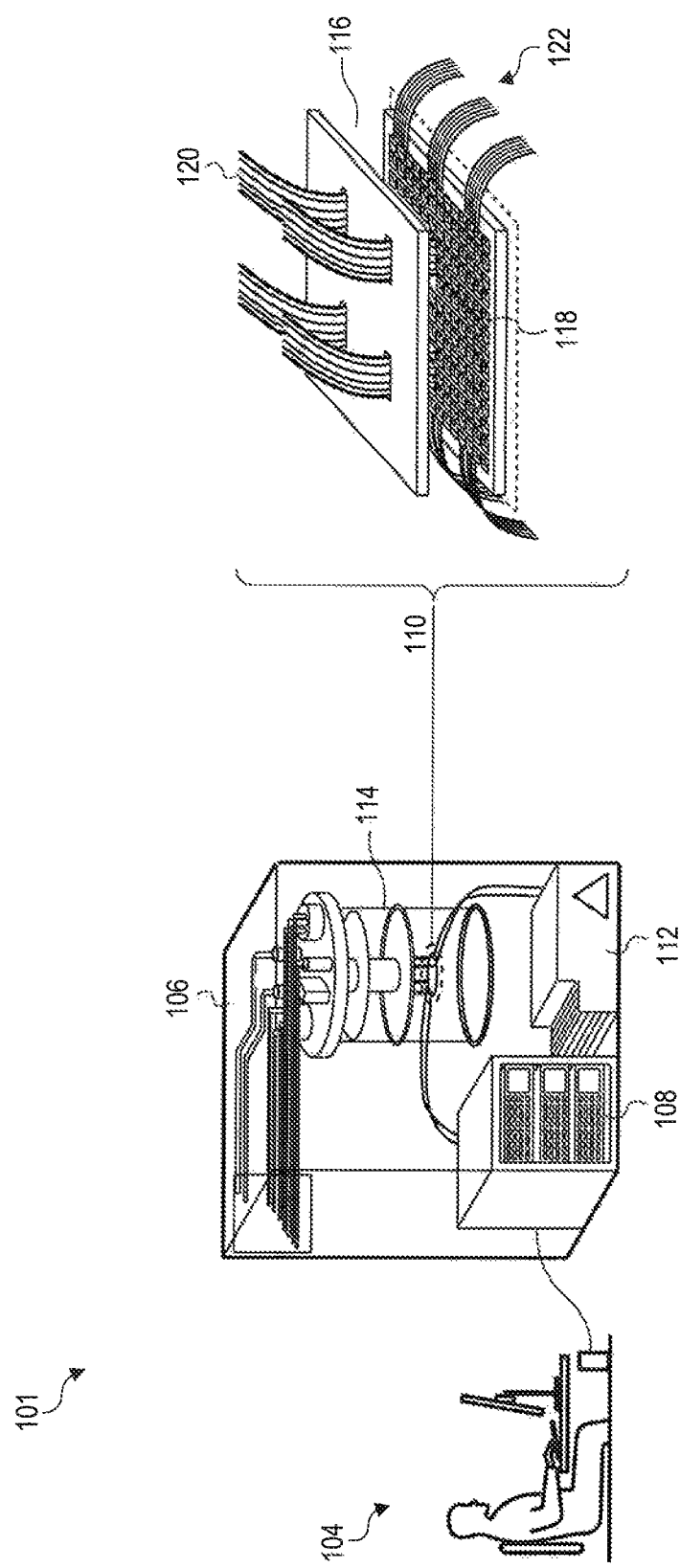
FIG. 1 shows a hybrid computing system in accordance with one or more embodiments.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Many modifications and variations of this disclosure can be made without departing from its spirit and scope, as will be apparent to those skilled in the art. The specific implementations described herein are offered by way of example only, and the disclosure is to be limited only by the terms of the appended claims, along with the full scope of equivalents to which such claims are entitled.

I. Introduction to Qubits and Path Encoding

The dynamics of quantum objects, e.g., photons, electrons, atoms, ions, molecules, nanostructures, and the like, follow the rules of quantum theory. More specifically, in quantum theory, the quantum state of a quantum object, e.g., a photon, is described by a set of physical properties, the complete set of which is referred to as a mode. In some embodiments, a mode is defined by specifying the value (or distribution of values) of one or more properties of the quantum object. For example, again for photons, modes can be defined by the frequency of the photon, the position in space of the photon (e.g., which waveguide or superposition of waveguides the photon is propagating within), the associated direction of propagation (e.g., the k-vector for a photon in free space), the polarization state of the photon (e.g., the direction (horizontal or vertical) of the photon's electric and/or magnetic fields) and the like.

For the case of photons propagating in a waveguide, it is convenient to express the state of the photon as one of a set of discrete spatio-temporal modes. For example, the spatial mode $k_i$ of the photon is determined according to which one of a finite set of discrete waveguides the photon can be propagating in. Furthermore, the temporal mode $t_j$ is determined by which one of a set of discrete time periods (referred to herein as "bins") the photon can be present in. In some embodiments, the temporal discretization of the system can be provided by the timing of a pulsed laser which is responsible for generating the photons. In the examples below, spatial modes will be used primarily to avoid complication of the description. However, one of ordinary skill will appreciate that the systems and methods can apply to any type of mode, e.g., temporal modes, polarization modes, and any other mode or set of modes that serves to specify the quantum state. Furthermore, in the description that follows, embodiments will be described that employ photonic waveguides to define the spatial modes of the photon. However, one of ordinary skill having the benefit of this disclosure will appreciate that any type of mode, e.g., polarization modes, temporal modes, and the like, can be used without departing from the scope of the present disclosure.

For quantum systems of multiple indistinguishable particles, rather than describing the quantum state of each particle in the system, it is useful to describe the quantum state of the entire many-body system using the formalism of Fock states (sometimes referred to as the occupation number representation). In the Fock state description, the many-body quantum state is specified by how many particles there are in each mode of the system. Because modes are the complete set of properties, this description is sufficient. For example, a multi-mode, two particle Fock state $|1001\rangle_{1,2,3,4}$ specifies a two-particle quantum state with one photon in mode 1, zero photons in mode 2, zero photons in mode three, and 1 photon in mode four. Again, as introduced above, a mode can be any set of properties of the quantum object (and can depend on the single particle basis states being used to define the quantum state). For the case of the photon, any two modes of the electromagnetic field can be used, e.g., one may design the system to use modes that are related to a degree of freedom that can be manipulated passively with linear optics. For example, polarization, spatial degree of freedom, or angular momentum, could be used. For example, the four-mode system represented by the two particle Fock state $|1001\rangle_{1,2,3,4}$ can be physically implemented as four distinct waveguides with two of the four waveguides (representing mode 1 and mode 4, respectively) having one photon travelling within them. Other examples of a state of such a many-body quantum system are the four photon Fock state $|1111\rangle_{1,2,3,4}$ that represents each waveguide containing one photon and the four photon Fock state $|2200\rangle_{1,2,3,4}$ that represents waveguides one and two respectively housing two photons and waveguides three and four housing zero photons. For modes having zero photons present, the term "vacuum mode" is used. For example, for the four photon Fock state $|2200\rangle_{1,2,3,4}$ modes 3 and 4 are referred to herein as "vacuum modes" (also referred to as "ancilla modes").

As used herein, a "qubit" (or quantum bit) is a physical quantum system with an associated quantum state that can be used to encode information. Qubits, in contrast to classical bits, can have a state that is a superposition of logical values such as 0 and 1. In some embodiments, a qubit is "dual-rail encoded" such that the logical value of the qubit is encoded by occupation of one of two modes by exactly one photon (a single photon). For example, consider the two spatial modes of a photonic system associated with two distinct waveguides. In some embodiments, the logical 0 and 1 values can be encoded as follows:

$$|0\rangle_L = |10\rangle_{1,2} \quad (1)$$

$$|1\rangle_L = |01\rangle_{1,2} \quad (2)$$

where the subscript "L" indicates that the ket represents a logical value (e.g., a qubit value) and, as before, the notation $|ij\rangle_{1,2}$ on the right-hand side of the Equations (1)-(2) above indicates that there are i photons in a first waveguide and j photons in a second waveguide, respectively (e.g., where i and j are integers). In this notation, a two qubit state having a logical value $|01\rangle_L$ (representing a state of two qubits, the first qubit being in a '0' logical state and the second qubit being in a '1' logical state) may be represented using photon occupations across four distinct waveguides by $|1001\rangle_{1,2,3,4}$ (i.e., one photon in a first waveguide, zero photons in a second waveguide, zero photons in a third waveguide, and one photon in a fourth waveguide). In some instances, throughout this disclosure, the various subscripts are omitted to avoid unnecessary mathematical clutter.

A Bell pair is a pair of qubits in any type of maximally entangled state referred to as a Bell state. For dual rail encoded qubits, examples of Bell states include:

$$|\Phi^+\rangle = \frac{|0\rangle_L|0\rangle_L + |1\rangle_L|1\rangle_L}{\sqrt{2}} = \frac{|1010\rangle + |0101\rangle}{\sqrt{2}} \quad (3)$$

$$|\Phi^-\rangle = \frac{|0\rangle_L|0\rangle_L - |1\rangle_L|1\rangle_L}{\sqrt{2}} = \frac{|1010\rangle - |0101\rangle}{\sqrt{2}} \quad (4)$$

$$|\Psi^+\rangle = \frac{|0\rangle_L|1\rangle_L + |1\rangle_L|0\rangle_L}{\sqrt{2}} = \frac{|1001\rangle + |0110\rangle}{\sqrt{2}} \quad (5)$$

$$|\Psi^-\rangle = \frac{|0\rangle_L|1\rangle_L - |1\rangle_L|0\rangle_L}{\sqrt{2}} = \frac{|1001\rangle - |0110\rangle}{\sqrt{2}} \quad (6)$$

In a computational basis (e.g., logical basis) with two states, a Greenberger-Horne-Zeilinger state is a quantum superposition of all qubits being in a first state of the two states superposed with all of qubits being in a second state. Using logical basis described above, the general M-qubit GHZ state can be written as:

$$|GHZ| = \frac{|0\rangle^{\otimes M} + |1\rangle^{\otimes M}}{\sqrt{2}} \quad (7)$$

II. A Hybrid Classical-Quantum Computing System

FIG. 1 shows a hybrid computing system in accordance with one or more embodiments. The hybrid computing system 101 includes a user interface device 104 that is communicatively coupled to a hybrid quantum computing (QC) sub-system 106, described in more detail below in FIG. 2. The user interface device 104 can be any type of user interface device, e.g., a terminal including a display, keyboard, mouse, touchscreen and the like. In addition, the user interface device can itself be a computer such as a personal computer (PC), laptop, tablet computer and the like. In some embodiments, the user interface device 104 provides an interface with which a user can interact with the hybrid QC subsystem 106. For example, the user interface device 104 may run software, such as a text editor, an interactive development environment (IDE), command prompt, graphical user interface, and the like so that the user can program, or otherwise interact with, the QC subsystem to run one or more quantum algorithms. In other embodiments, the hybrid QC subsystem 106 may be pre-programmed and the user interface device 104 may simply be an interface where a user can initiate a quantum computation, monitor the progress, and receive results from the hybrid QC subsystem 106. Hybrid QC subsystem 106 further includes a classical computing system 108 coupled to one or more quantum computing chips 110. In some examples, the classical computing system 108 and the quantum computing chips 110 can be coupled to other electronic and/or optical components, e.g., pulsed pump lasers, microwave oscillators, power supplies, networking hardware, etc. In some embodiments that require cryogenic operation, the quantum computing chips 110 can be housed within a cryostat, e.g., cryostat 114. In other embodiments for which cryogenic operation is not required, the quantum computing chips 110, the cryostat 114 may be replaced with any other enclosure. In some embodiments, the quantum computing chips 110 can include one or more constituent chips, e.g., hybrid control electronics 116 and integrated photonics chip 118. Signals can be routed on- and off-chip any number of ways, e.g., via optical interconnects 120 and via other electronic interconnects 122. In addition, the hybrid computing system 101 may employ a quantum computing process, e.g., measurement-based quantum computing (MBQC), circuit-based quantum computing (CBQC) or any other quantum computing scheme.

Figure 2:
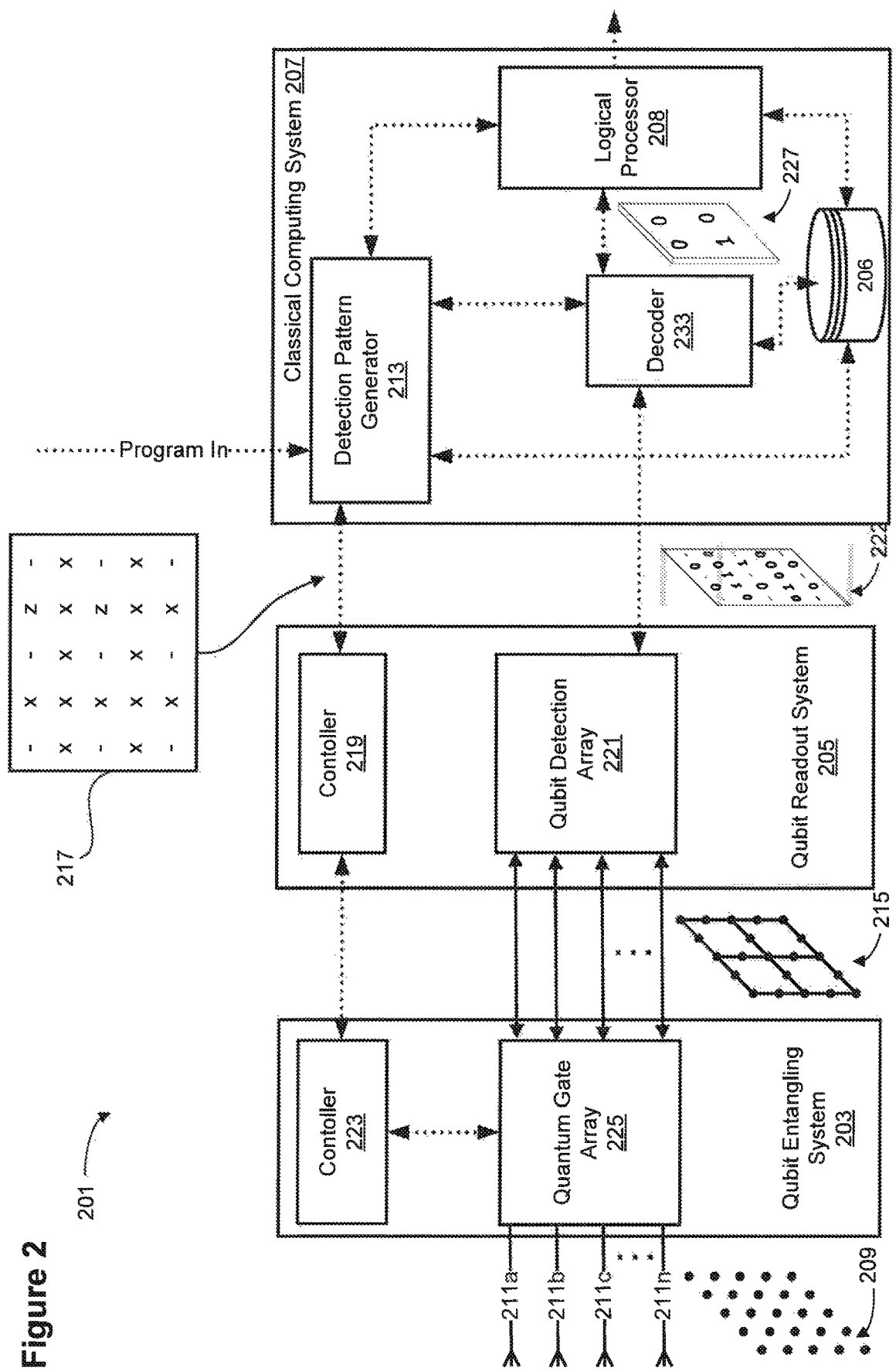
FIG. 2 shows a hybrid quantum computing system in accordance with some embodiments.

FIG. 2 shows a block diagram of a hybrid QC system 201 in accordance with some embodiments. Such a system can be associated with the hybrid computing system 101 introduced above in reference to FIG. 1. In FIG. 2, solid lines represent quantum information channels and dashed represent classical information channels. The hybrid QC system 201 includes a qubit entangling system 203, qubit readout circuit 205, and classical computing system 207. In some embodiments, the qubit entangling system 203 takes as input a collection of N physical qubits, e.g., physical qubits 209 (also represented schematically as inputs 211a, 211b, 211c, . . . , 211n) and generates quantum entanglement between two or more of them to generate an entangled state 215. For example, in the case of photonic qubits, the qubit entangling system 203 can be a linear optical system such as an integrated photonic circuit that includes waveguides, beam splitters, photon detectors, delay lines, and the like. In some examples, the entangled state 215 can be a lattice, cluster, or graph state, or one part of a larger lattice, cluster, or graph state that is created over the course of several clock cycles of the quantum computer. In some embodiments, the physical qubits 209 can be a collection of quantum systems and/or particles and can be formed using any qubit architecture. For example, the quantum systems can be particles such as atoms, ions, nuclei, and/or photons. In other examples, the quantum systems can be other engineered quantum systems such as flux qubits, phase qubits, or charge qubits (e.g., formed from a superconducting Josephson junction), topological qubits (e.g., Majorana fermions), or spin qubits formed from vacancy centers (e.g., nitrogen vacancies in diamond). Furthermore, for the sake of clarity of description, the term "qubit" is used herein although the system can also employ quantum information carriers that encode information in a manner that is not necessarily associated with a binary bit. For example, qudits can be used, i.e., quantum systems that can encode information in more than two quantum states in accordance with some embodiments.

In accordance with some embodiments, the hybrid QC system 201 can be a quantum circuit-based quantum computer or a measurement-based quantum computer. In either case, a software program (e.g., a set of machine readable instructions) that represents the quantum algorithm to be run on the hybrid QC system 201 can be passed to a classical computing system 207 (e.g., corresponding to classical computing system 107 in FIG. 1 above). The classical computing system 207 can be any type of computing device such as a PC, one or more blade servers, and the like, or even a high-performance computing system such as a supercomputer, server farm, and the like. Such a system can include one or more processors (not shown) coupled to one or more computer memories, e.g., memory 206. Such a computing system will be referred to herein as a "classical computer." In some examples, the software program can be received by a classical computing module, referred to herein as a detection pattern generator 213. One function of the detection pattern generator 213 is to generate a set of machine-level instructions from the input software program (which may originate as code that can be more easily written by a user to program the quantum computer), i.e., the detection pattern generator 213 operates as a compiler for software programs to be run on the quantum computer. Detection pattern generator 213 can be implemented as pure hardware, pure software, or any combination of one or more hardware or software components or modules. In some examples, the compiled machine-level instructions take the form of one or more data frames that instruct the qubit readout circuit to make one or more quantum measurements on the entangled state 215. Measurement pattern 217 (e.g., a data frame) is one example of the set of measurements that should be applied to the individual qubits of entangled state 215 during a certain clock cycle as the program is executed. In some embodiments, several measurement patterns 217 can be stored in memory 206 as classical data. Generally, the measurement patterns 217 can dictate whether or not a detector from the qubit detection array 221 of the qubit readout circuit 205 should make a measurement on a given qubit that makes up the entangled state 215. In addition, the measurement pattern 217 can also store which basis (e.g., Pauli X, Y, Z, etc.) the measurement should be made in order to execute the program. In some examples, the measurement pattern 217 can also include a set of gates that should be applied by the qubit entangling circuit to the next set of physical qubits 209 that are to be processed at some future clock cycle of the hybrid QC system 201.

A controller 219 of the qubit readout circuit 205 can receive data that encodes the measurement pattern 217 and generate the configuration signals necessary to drive a set of detectors within the qubit detection array 221. The detectors can be any detector that can detect the quantum states of one or more of the qubits in the entangled state 215. For example, for the case of photonic qubits, the detectors can be single photon detectors that are coupled to one or more waveguides, beam splitters, interferometers, switches, polarizers, polarization rotators and the like. One of ordinary skill will appreciate that many types of detectors may be used depending on the particular qubit architecture.

In some embodiments, the result of applying the measurement pattern 217 (e.g. a detection pattern) to the qubit detection array is a readout operation that "reads out" the quantum states of the qubits in the entangled state 215. Once this measurement is accomplished, the quantum information stored within the entangled state 215 is converted to classical information that corresponds to a set of eigenvalues that are measured by the detectors, referred to herein as "measurement outcomes." These measurement outcomes can be stored in a measurement outcome data frame, e.g., data frame 222 and passed back to the classical computing system for further processing.

In some embodiments, any of the submodules in the hybrid QC system 201, e.g., controller 223, quantum gate array 225, qubit detection array 221, controller 219, detection pattern generator 213, decoder 233, and logical processor 208 can include any number of classical computing components such as processors (CPUs, GPUs, TPUs) memory (any form of RAM, ROM), hard coded logic components (classical logic gates such as AND, OR, XOR, etc.) and/or programmable logic components such as field programmable gate arrays (FPGAs and the like). These modules can also include any number of application specific integrated circuits (ASICs), microcontrollers (MCUs), systems on a chip (SOCs), and other similar microelectronics.

In some embodiments, the entangled state 215 can be any cluster state described herein. As described herein, the logical qubit measurement outcomes 227 can be fault tolerantly recovered, e.g., via decoder 233, from the data frames 222 of the physical qubits. Logical processor 208 can then process the logical outcomes as part of the running of the program. As shown, the logical processor can feed back information to the detection pattern generator 213 to affect downstream gates and/or measurements to ensure that the computation proceeds fault tolerantly.

In the description that follows, embodiments will be described that employ spatial modes of photons as the qubit system, but one of ordinary skill will appreciate that any type of qubit described by any type of mode can be employed without departing from the scope of the present disclosure. Furthermore, in what follows, photonic waveguides are used to define the spatial modes of the photon. However, one of ordinary skill having the benefit of this disclosure will appreciate that any type of mode, e.g., polarization modes, temporal modes, and the like, can be used without departing from the scope of the present disclosure. The diagrams shown in the remaining figures are schematic diagrams with each horizontal line representing a mode of a quantum system, e.g., a waveguide.

As used herein, the term "quantum computing resource" is intended to include algorithmic resources as well as precursor resources (e.g., resources that are combined with other resources to form a larger resource, which may be an algorithmic resource). Algorithmic resources may include universal quantum computing resource states and/or fault-tolerant computational resource states.

III. Generation of Entangled Qubit States

FIGS. 3A-3H are schematic diagrams illustrating devices 300 for generating entangled qubit states, in accordance with some embodiments.

Figure 3A:
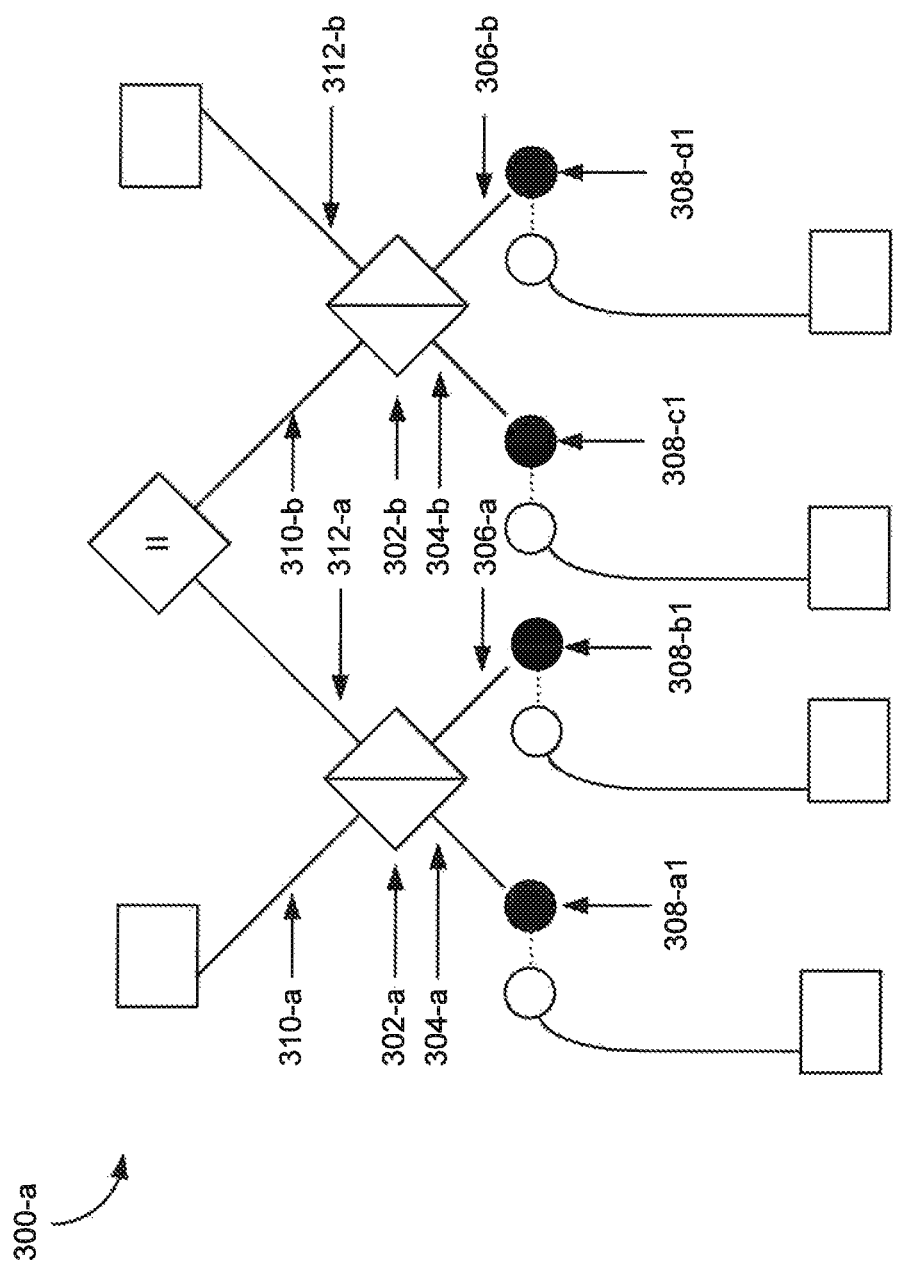
FIGS. 3A-3H are schematic diagrams illustrating devices for generating entangled qubit states, in accordance with some embodiments.
Figure 3B:
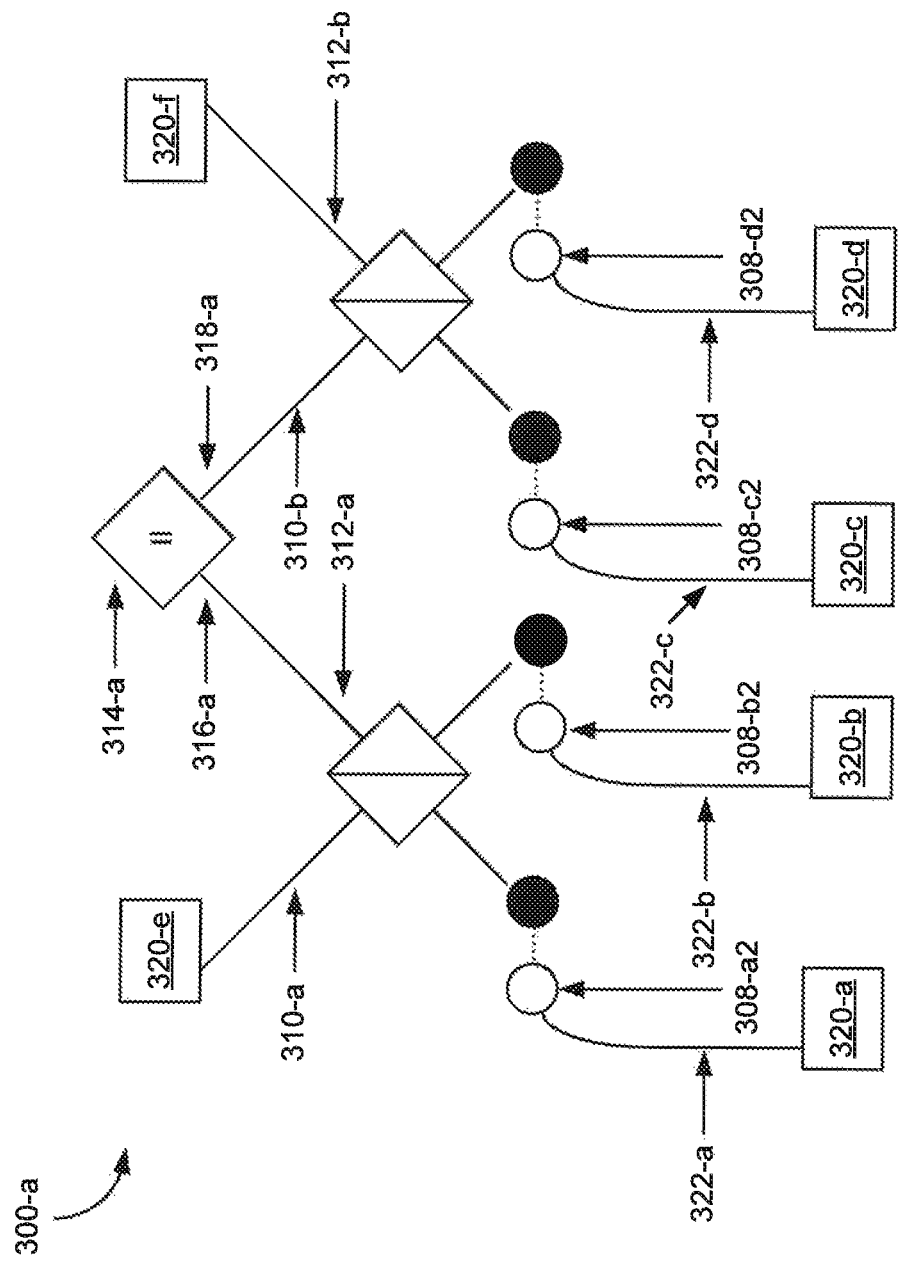

FIGS. 3A-3B are schematic diagrams of a device 300-*a* for generating entangled qubit states in accordance with some embodiments. FIG. 3A and FIG. 3B illustrate the same device, but show different reference numbers for visual clarity. Thus, FIGS. 3A-3B should be viewed together.

Device 300-*a* probabilistically generates (or provides) six qubits in a GHZ state (also called herein a 6-photon GHZ state) from 4 pairs of qubits (i.e., 8 qubits), each pair in a Bell state (also called herein 4 Bell pairs). Examples of n-GHZ states and Bell states are shown above (for the dual rail encoding) in Eqns. (1)-(7). The dual rail encoding has a one-to-one correspondence with the polarization encoding per the following definitions:

$$|0\rangle_L = |10\rangle_{1,2} \rightarrow |h\rangle \quad (8)$$

$$|1\rangle_L = |01\rangle_{1,2} \rightarrow |v\rangle, \quad (9)$$

with the choice of which logical state ($|0\rangle$ or $|1\rangle$) maps to which polarization/dual rail encoded state being an arbitrary choice, i.e., h and v in equations (8) and (9) above can be swapped without departing from the scope of the present disclosure.

When successful, the 6-qubit GHZ state includes a qubit at each output channel 320 (e.g., a single-qubit at each output channel 320). The qubit at each output channel 320 is entangled with the qubit at each other output channel 320 of device 300-*a* such that the output qubits are in the GHZ state (e.g., the set of output qubits is in a maximally-entangled state). More specifically the 6-qubit GHZ state includes qubits 308-*a*2, 308-*b*2, 308-*c*2, 320-*d*2, and the two remaining output qubits that our output at each output channel 320.

Figure 12:
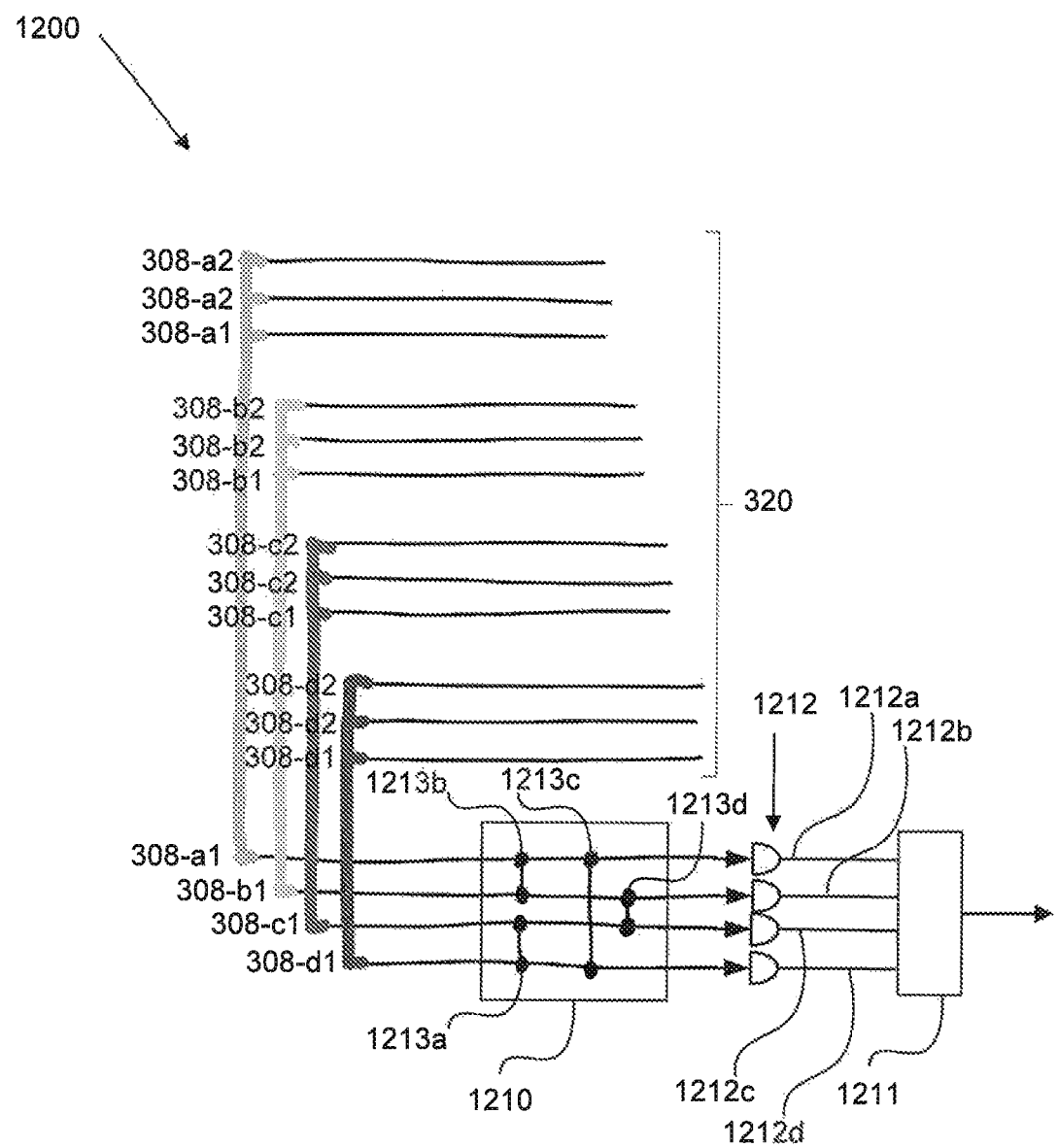
FIG. 12 is a schematic diagram illustrating devices for generating entangled qubit states, in accordance with some embodiments.

In some embodiments, as described below, device 300-*a* can be implemented with photonic qubits, i.e., qubits that are photons in which case the device 300-*a* includes two distinct and separate beam splitters and a single fusion gate. Fusion gates are described in more detail below in reference to FIGS. 4A and 4B. A path encoded version of device 300-*a* in a photonic qubit implementation is shown in FIG. 12. At least one photon output from each beam splitter of the two distinct and separate beam splitters is provided to the fusion gate (e.g., each of the two distinct and separate beam splitters provides a photon to the fusion gate). In some embodiments, each of the photons received by the fusion gate is provided by an output from a beam splitter (e.g., a distinct beam splitter). In some embodiments, the fusion gate receives photons from each of the two distinct beam splitters.

Device 300-*a* includes a first beam splitter 302-*a* (e.g., a photonic interference-based beam splitter, FIG. 5) coupled with a first input channel 304-*a* for the first beam splitter 302-*a*. The first input channel 304-*a* for the first beam splitter 302-*a* is configured for receiving a first photon 308-*a*1 of a photon pair 308-*a* (e.g., a pair of photons 308-*a*1 and 308-*a*2) from a first photon source (not shown) (e.g., a respective Bell pair source, FIG. 6) of a plurality of photon sources (not shown).

In some embodiments, the beam splitters 302 include a polarization rotator at each input and output. For visual clarity, these polarization rotators are not shown in FIGS. 3A-3H, but their operation is described with reference to method 700.

The first beam splitter 302-*a* is further coupled with a second input channel 306-*a* for the first beam splitter 302-*a*. The second input channel 306-*a* for the first beam splitter 302-*a* is configured for receiving a first photon 308-*b*1 of a photon pair 308-*b* (e.g., a pair of photons 308-*b*1 and 308-*b*2) from a second photon source (e.g., a respective Bell pair source, FIG. 6) of the plurality of photon sources.

The first beam splitter 302-*a* is further coupled with a first output channel 310-*a* for the first beam splitter 302-*a* and a second output channel 312-*a* for the first beam splitter 302-*a*.

In some embodiments, a first channel and a second channel are respective portions of a single (typically larger and/or longer) channel. For example, first input channels 304 and first output channels 310 may be portions (e.g., lengths or segments) of a single micro-photonic (e.g., integrated) channel fabricated on a chip. Similarly, second input channels 306 and second output channels 312 may be portions (e.g., lengths or segments) of a single micro-photonic (e.g., integrated) channel fabricated on a chip.

Device 300-*a* further includes a second beam splitter 302-*b* (e.g., a photonic interference-based beam splitter, FIG. 5) coupled with a first input channel 304-*b* for the second beam splitter 302-*b*. The first input channel 304-*b* for the second beam splitter 302-*b* is configured for receiving a first photon 308-*c*1 of a photon pair 308-*c* (e.g., a pair of photons 308-*c*1 and 308-*c*2) from a third photon source (e.g., a respective Bell pair source, FIG. 6) of the plurality of photon sources.

The second beam splitter 302-*b* is further coupled with a second input channel 306-*b* for the second beam splitter 302-*b*. The second input channel 306-*b* for the second beam splitter 302-*b* is configured for receiving a first photon 308-*d*1 of a photon pair 308-*d* (e.g., a pair of photons 308-*d*1 and 308-*d*2) from a fourth photon source (e.g., a respective Bell pair source, FIG. 6) of the plurality of photon sources.

The second beam splitter 302-*b* is further coupled with a first output channel 310-*b* for the second beam splitter 302-*b* and a second output channel 312-*b* for the second beam splitter 302-*b*.

Device 300-*a* further includes a first fusion gate 314-*a*. In some embodiments, the first fusion gate 314-*a* is a Type-II fusion gate, as described below with reference to FIG. 4B.

The first fusion gate 314-*a* is coupled with a first input channel 316-*a* for the first fusion gate 314-*a*. The first input channel 316-*a* for the first fusion gate 314-*a* is coupled with the second output channel 312-*a* of the first beam splitter 302-*a*. The first fusion gate 314-*a* is further coupled with a second input channel 318-*a* for the first fusion gate 314-*a*. The second input channel 318-*a* for the first fusion gate 314-*a* is coupled with the first output channel 310-*b* of the second beam splitter 302-*b*.

In some embodiments, as shown in FIGS. 3A and 3B, device 300-*a* further includes: input channel 322-*a* for receiving a second photon 308-*a*2 of the photon pair 308-*a* from the first photon source (e.g., a Bell pair source); input channel 322-*b* for receiving a second photon 308-*b*2 of the photon pair 308-*b* from the second photon source (e.g., a Bell pair source); input channel 322-*c* for receiving a second photon 308-*c*2 of the photon pair 308-*c* from the third photon source (e.g., a Bell pair source); and input channel 322-*d* for receiving a second photon 308-*d*2 of the photon pair 308-*d* from the fourth photon source (e.g., a Bell pair source).

Each respective input channel 322 for receiving a second photon is coupled with a respective output channel 320. For example, input channel 322-*a* is coupled with output channel 320-*a*; input channel 322-*b* is coupled with output channel 320-*b*; input channel 322-*c* is coupled with output channel 320-*c*; and input channel 322-*d* is coupled with output channel 320-*d*. The photons provided to output channels 320 (e.g., second photons 308-*a*2, 308-*b*2, 308-*c*2, 308-*d*2, and the photons provided to output channels 320-*e* and 320-*f*) are, at least probabilistically, in a 6-photon GHZ state after the first fusion gate 314-*a* operates on the photons it receives. In some embodiments, the outcome of the operation of the first fusion gate 314-*a* (e.g., detection of two photons) is used to determine whether the photons provided to output channels 320 are in a 6-photon GHZ state.

Again, respective output channels 320 and the corresponding channels coupled with the respective output channels 320 (e.g., input channels 322 and/or output channels 316/318) may be portions (e.g., lengths or segments) of a single channel (e.g., a micro-photonic and/or integrated channel fabricated on a chip). Likewise, output channels 310/312 and the corresponding input channels 316/318 coupled with output channels 310/312 may be portions (e.g., lengths or segments) of a single channel (e.g., a micro-photonic and/or integrated channel fabricated on a chip).

Figure 3C:
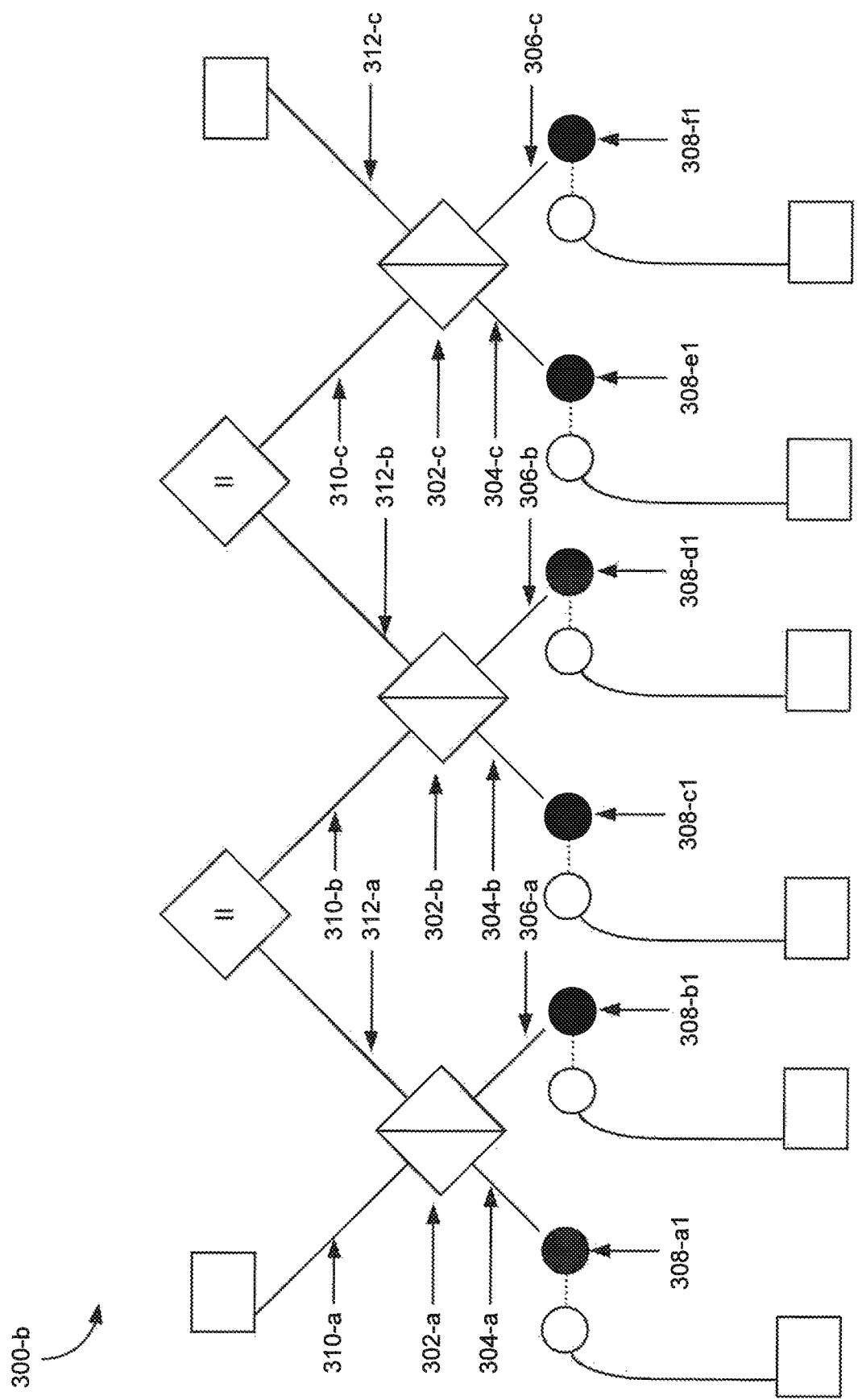
Figure 3D:
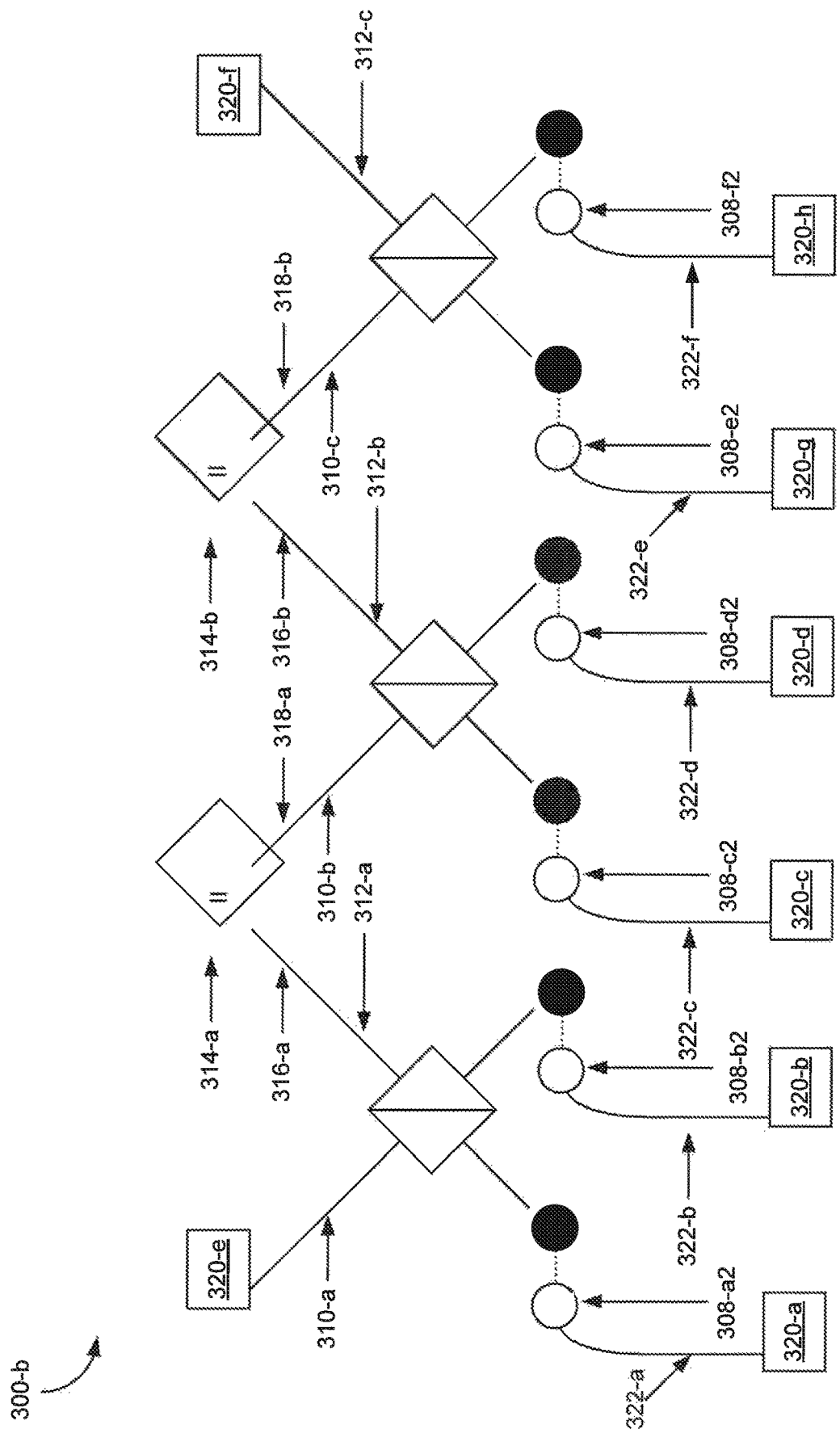

FIGS. 3C-3D are schematic diagrams of a device 300-*b* for generating entangled qubit states in accordance with some embodiments. FIG. 3C and FIG. 3D illustrate the same device, but show different reference numbers for visual clarity. Thus, FIGS. 3C-3D should be viewed together.

Device 300-*b* probabilistically generates (or provides) eight photons in a GHZ state (also called herein an 8-photon GHZ state) from 6 pair of photons (i.e., 12 photons), each pair in a Bell state (also called herein 6 Bell pairs). When successful, the 8-photon GHZ state includes a photon at each output channel 320 (e.g., a single-photon at each output channel 320). The photon at each output channel 320 is entangled with the photon at each other output channel 320 of device 300-*b* such that the output photons are in a GHZ state (e.g., the set of output photons is maximally entangled).

Device 300-*b* is analogous to device 300-*a*, but with the following differences and additions.

In some embodiments, as described below, device 300-*b* includes a plurality of (e.g., three) distinct and separate beam splitters and a plurality of (e.g., two) fusion gates (e.g., Type II fusion gates). At least one photon output from each beam splitter of the three distinct and separate beam splitters is provided to one of the plurality of fusion gates (e.g., each of the three distinct and separate beam splitters provides a photon to a respective fusion gate of the plurality of fusion gates). In some embodiments, each of the photons received by the plurality of fusion gates is provided by an output of a beam splitter (e.g., none of the photons received by the respective fusion gate of the plurality of fusion gates is received directly from a Bell pair generator). In some embodiments, each fusion gate of the plurality of fusion gates receives photons from two distinct beam splitters of the plurality of beam splitters.

Figure 5:
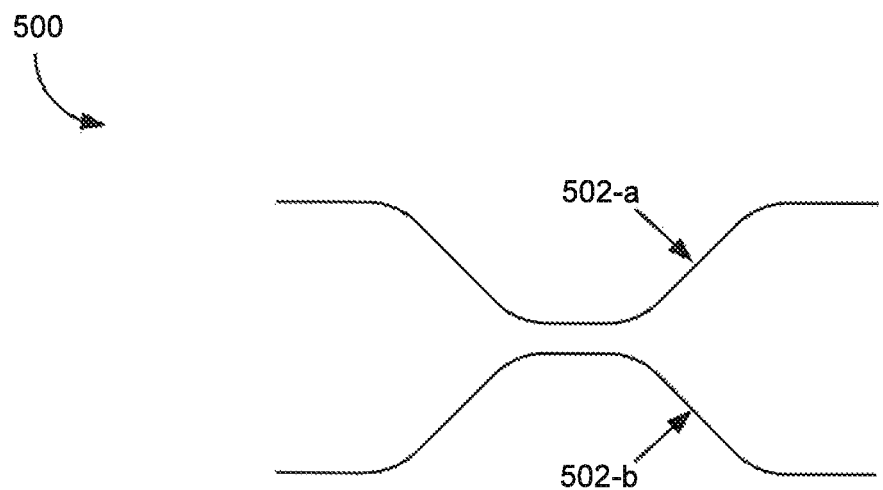
FIG. 5 is a schematic diagram illustrating an interference-based micro-photonic beam splitter, in accordance with some embodiments.

Device 300-*b* includes a third beam splitter 302-*c* (e.g., a photonic interference-based beam splitter, FIG. 5). The third beam splitter 302-*c* is coupled with a first input channel 304-*c* for the third beam splitter 302-*c*. The first input channel 304-*c* is configured for receiving a first photon 308-*e*1 of a photon pair 308-*e* (e.g., a pair of photons 308-*e*1 and 308-*e*2) from a fifth photon source (e.g., a respective Bell pair source, FIG. 6) of the plurality of photon sources. The third beam splitter 302-*c* is further coupled with a second input channel 306-*c* for the third beam splitter 302-*c*. The second input channel 306-*c* is configured for receiving a first photon 308-*f*1 of a photon pair 308-*f* (e.g., a pair of photons 308-*f*1 and 308-*f*2) from a sixth photon source (e.g., a respective Bell pair source, FIG. 6) of the plurality of photon sources.

The third beam splitter 302-*c* is further coupled with a first output channel 310-*c* for the third beam splitter 302-*c* and a second output channel 312-*c* for the third beam splitter 302-*c*. Device 300-*b* further includes a second fusion gate 314-*b*. In some embodiments, the second fusion gate 314-*b* is a Type-II fusion gate, as described below with reference to FIG. 4B.

The second fusion gate 314-*b* is coupled with a first input channel 316-*b* for the second fusion gate 314-*b*. The first input channel 316-*b* for the second fusion gate 314-*b* is coupled with the second output channel 312-*b* of the second beam splitter 302-*b*. The second fusion gate 314-*b* is further coupled with a second input channel 318-*b* for the second fusion gate 314-*b*. The second input channel 318-*b* for the second fusion gate 314-*b* is coupled with the first output channel 310-*c* of the third beam splitter 302-*c*.

Device 300-*b* further includes: input channel 322-*e* for receiving a second photon 308-*e*2 from the photon pair 308-*e* from the fifth photon source and input channel 322-*f* for receiving a second photon 308-*f*2 from the photon pair 308-*f* from the sixth photon source.

Each respective input channel 322 for receiving a second photon is coupled with a respective output channel 320. For example, in addition to those input channels described with reference to device 300-*a*, input channel 322-*e* is coupled with output channel 320-*g* and input channel 322-*f* is coupled with output channel 320-*h*. The photons provided to output channels 320 (e.g., second photons 308-*a*2, 308-*b*2, 308-*c*2, 308-*d*2, 308-*e*2, 308-*f*2 and the photons received via channels 310-*a* and 312-*c*) are, at least probabilistically, in an 8-photon GHZ state after the first fusion gate 314-*a* operates on the photons it receives and the second fusion gate 314-*b* operates on the photons it receives. In some embodiments, the outcome of the operation of the first fusion gate 314-*a* (e.g., detection of two photons) and the operation of the second fusion gate 314-*b* (e.g., detection of two photons) are used to determine whether the photons provided to output channels 320 are in an 8-photon GHZ state.

Figure 3E:
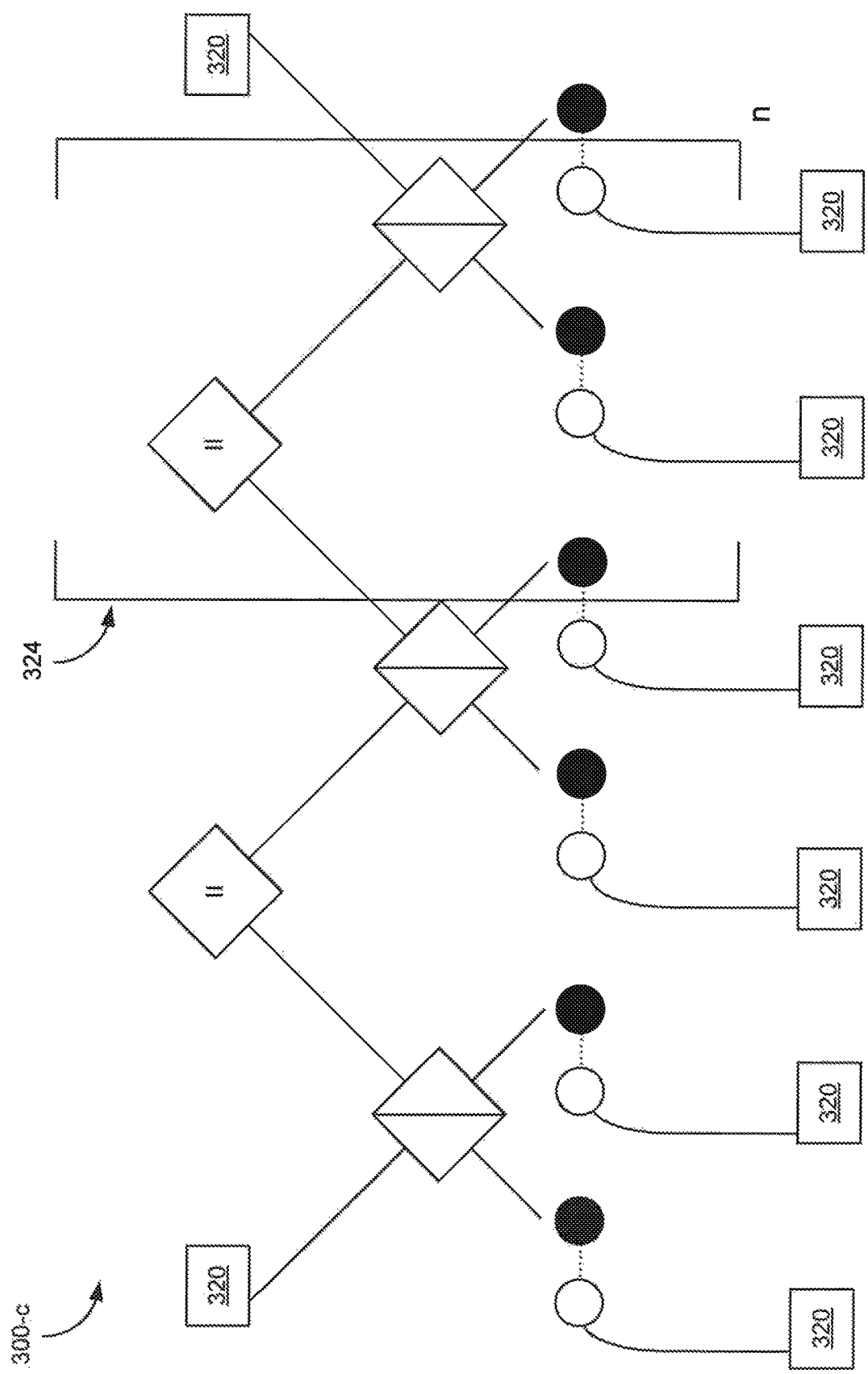

FIG. 3E is a schematic diagram of a device 300-*c* for generating entangled qubit states, in accordance with some embodiments. Device 300-*c* is analogous to device 300-*b* (FIGS. 3C-3D) except that FIG. 3E includes a repeating unit 324 which is repeated n times, where n is greater than or equal to 1 (e.g., in some configurations, device 300-*c* includes three fusion gates 314). Device 300-*c* probabilistically generates a (2n+6)-photon GHZ state (e.g., (2n+6) photons in a GHZ state) from (2n+4) pairs of photons (i.e., 4n+8 photons), each pair in a Bell state (also called herein (2n+4) Bell pairs). When successful, the (2n+6)-photon GHZ state includes a photon at each output channel 320 (e.g., a single-photon at each output channel 320). The photon at each output channel 320 is entangled with the photon at each other output channel 320 of device 300-*c* such that the output photons are in a GHZ state (e.g., the set of output photons is in a maximally-entangled state).

Device 300-*b* is an example of device 300-*c* with n=1. Thus, FIG. 3E illustrates that device 300-*b* can be extended to form an arbitrarily large GHZ state (e.g., a GHZ state having an arbitrarily large even number of photons), albeit with decreasing probability of success as the size of the GHZ state increases (e.g., because the outcomes measured by each of the fusion gates must be indicative of success, which becomes less likely as there are more fusion gates corresponding to more necessary and independent indicia of success).

Another example is n=2, in which case device 300-*c* generates a 10-photon GHZ state. In that example, device 300-*c* includes a fourth beam splitter. The fourth beam splitter is coupled with a first input channel for the fourth beam splitter. The first input channel for the fourth beam splitter is configured for receiving a first photon of a photon pair from a seventh photon source (e.g., a respective Bell pair source, FIG. 6) of the plurality of photon sources. The fourth beam splitter is coupled with a second input channel for the fourth beam splitter. The second input channel for the fourth beam splitter is configured for receiving a first photon of a photon pair from an eighth photon source (e.g., a respective Bell pair source, FIG. 6) of the plurality of photon sources. The n=2 example of device 300-*c* includes a first output channel for the fourth beam splitter and a second output channel for the fourth beam splitter. The n=2 example of device 300-*c* further includes a third fusion gate (e.g., a third Type-II fusion gate) coupled with a first input channel for the third fusion gate. The first input channel for the third fusion gate is coupled with the second output channel of the third beam splitter. The third fusion gate is coupled with a second input channel for the third fusion gate. The second input channel for the third fusion gate is coupled with the first output channel of the fourth beam splitter. Device 300-*c* respective input channels for receiving second photons from: the photon pair from the seventh photon source and the photon pair from the eighth photon source. Each respective input channel for receiving a second photon is coupled with a respective output channel.

As shown below, the n=2 example of device 300-*c* is similar to device 300-*d* illustrated in FIGS. 3F and 3G, but with three Type-II fusion gates rather than a Type-I fusion gate sandwiched between two Type-II fusion gates.

Figure 3F:
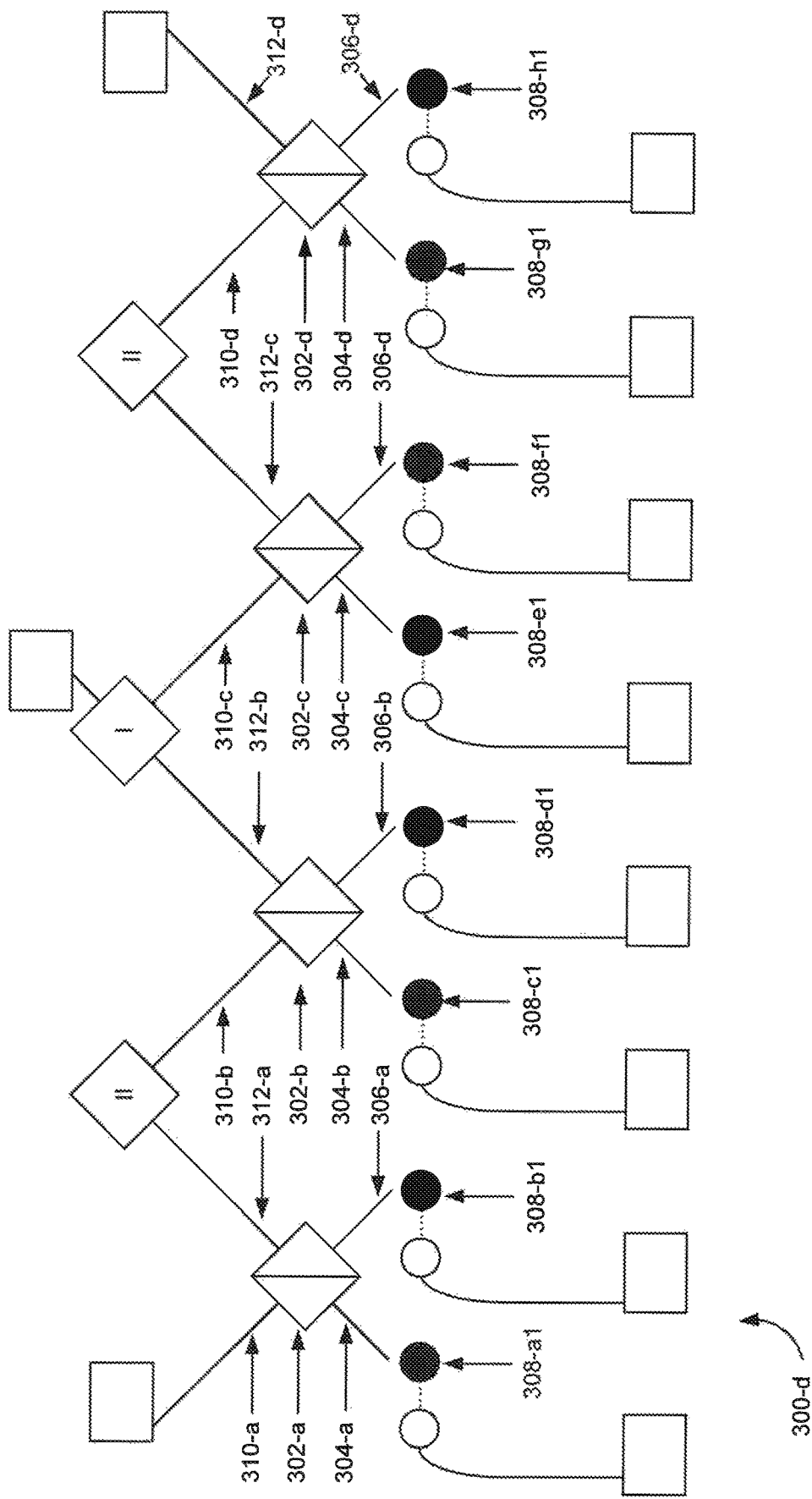
Figure 3G:
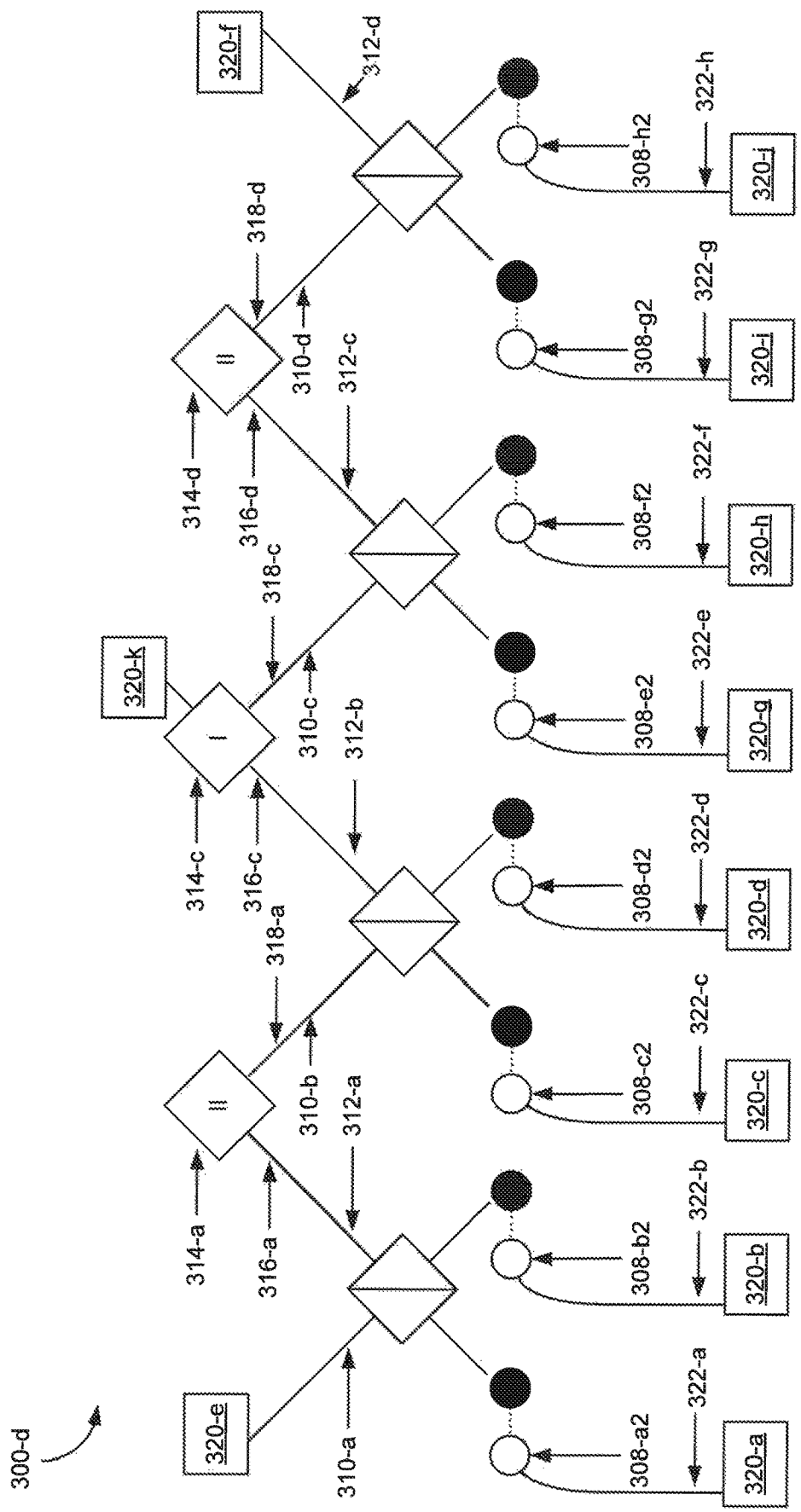

FIGS. 3F-3G are schematic diagrams of a device 300-*d* for generating entangled qubit states in accordance with some embodiments. FIG. 3F and FIG. 3G illustrate the same device, but show different reference numbers for visual clarity. Thus, FIGS. 3F-3G should be viewed together.

Device 300-*d* probabilistically generates an 11-photon GHZ state from 8 Bell pairs (i.e., 16 photons). When successful, the 11-photon GHZ state includes a photon at each output channel 320. The photon at each output channel 320 is entangled with the photon at each other output channel 320 of the device 300-*d* such that the output photons are in a GHZ state (e.g., the set of output photons is in a maximally-entangled state).

Device 300-*d* is analogous to device 300-*a*, but with the following differences and additions.

Device 300-*d* includes a third beam splitter 302-*c* (e.g., a photonic beam splitter, FIG. 5). The third beam splitter 302-*c* is coupled with a first input channel 304-*c* for the third beam splitter 302-*c*. The first input channel 304-*c* is configured for receiving a first photon 308-*e*1 of a photon pair 308-*e* from a fifth photon source (e.g., a respective Bell pair source, FIG. 6) of the plurality of photon sources. The third beam splitter 302-*c* is further coupled with a second input channel 306-*c* for the third beam splitter 302-*c*. The second input channel 306-*c* is configured for receiving a first photon 308-*f*1 of a photon pair 308-*f* from a sixth photon source (e.g., a respective Bell pair source, FIG. 6) of the plurality of photon sources.

The third beam splitter 302-*c* is further coupled with a first output channel 310-*c* for the third beam splitter 302-*c* and a second output channel 312-*c* for the third beam splitter 302-*c*.

Device 300-*d* further includes a second fusion gate 314-*c*. In some embodiments, the second fusion gate 314-*c* is a Type-I fusion gate, as described below with reference to FIG. 4A.

The second fusion gate 314-*c* is coupled with a first input channel 316-*c* for the second fusion gate 314-*c*. The first input channel 316-*c* for the second fusion gate 314-*c* is coupled with the second output channel 312-*b* of the second beam splitter 302-*b*. The second fusion gate 314-*c* is further coupled with a second input channel 318-*c* for the second fusion gate 314-*c*. The second input channel 318-*c* for the second fusion gate 314-*c* is coupled with the first output channel 310-*c* of the third beam splitter 302-*c*.

Device 300-*d* further includes a fourth beam splitter 302-*d* (e.g., a photonic interference-based beam splitter, FIG. 5). The fourth beam splitter 302-*d* is coupled with a first input channel 304-*d* for the fourth beam splitter 302-*d*. The first input channel 304-*d* is configured for receiving a first photon 308-*g*1 of a photon pair 308-*g* from a seventh photon source (e.g., a respective Bell pair source, FIG. 6) of the plurality of photon sources.

The fourth beam splitter 302-*d* is coupled with a second input channel 306-*d* for the fourth beam splitter 302-*d*. The second input channel 306-*d* is configured for receiving a first photon 308-*h*1 of a photon pair 308-*h* from an eighth photon source (e.g., a respective Bell pair source, FIG. 6) of the plurality of photon sources.

The fourth beam splitter 302-*d* is coupled with a first output channel 310-*d* for the fourth beam splitter 302-*d* and second output channel 312-*d* for the fourth beam splitter 302-*d*.

Device 300-*d* further includes a third fusion gate 314-*d*. The third fusion gate 314-*d* is coupled with a first input channel 316-*d* for the third fusion gate 314-*d*. The first input channel 316-*d* for the third fusion gate 314-*d* is coupled with the second output channel 312-*c* of the third beam splitter. The third fusion gate 314-*d* is coupled with a second input channel 318-*d* for the third fusion gate 314-*d*. The second input channel 318-*d* for the third fusion gate 314-*d* is coupled with the first output channel 310-*d* of the fourth beam splitter 302-*d*.

Device 300-*d* further includes: input channel 322-*e* for receiving a second photon 308-*e*2 from the photon pair 308-*e* from the fifth photon source; input channel 322-*f* for receiving a second photon 308-*f*2 from the photon pair 308-*f* from the sixth photon source; input channel 322-*g* for receiving a second photon 308-*g*2 from the photon pair 308-*g* from the seventh photon source; and input channel 322-*h* for receiving a second photon 308-*h*2 from the photon pair 308-*h* from the eighth photon source.

Each respective input channel 322 for receiving a second photon is coupled with a respective output channel 320. For example, in addition to those input channels described with reference to device 300-*a*: input channel 322-*e* is coupled with output channel 320-*g*; input channel 322-*f* is coupled with output channel 320-*h*; input channel 322-*g* is coupled with output channel 320-*i*; and input channel 322-*h* is coupled with output channel 320-*j*.

The photons provided to output channels 320 (e.g., second photons 308-*a*2, 308-*b*2, 308-*c*2, 308-*d*2, 308-*e*2, 308-*f*2, 308-*g*2, 308-*h*2 and the photons received by output channels 320-*e*, 320-*k*, and 320-*f*) are, at least probabilistically, in an 11-photon GHZ state (e.g., 11 photons in a GHZ state) after the first fusion gate 314-a operates on the photons it receives, the second fusion gate 314-c operates on the photons it receives; and the third fusion gate 314-d operates on the photons it receives. In some embodiments, the outcome of the operation of the first fusion gate 314-a (e.g., detection of two photons), the outcome of the operation of the second fusion gate 314-c (e.g., detection of one photon), and the outcome of the operation of the third fusion gate 314-d (e.g., detection of two photons) are used to determine whether the photons provided to output channels 320 are in an 11-photon GHZ state.

Figure 3H:
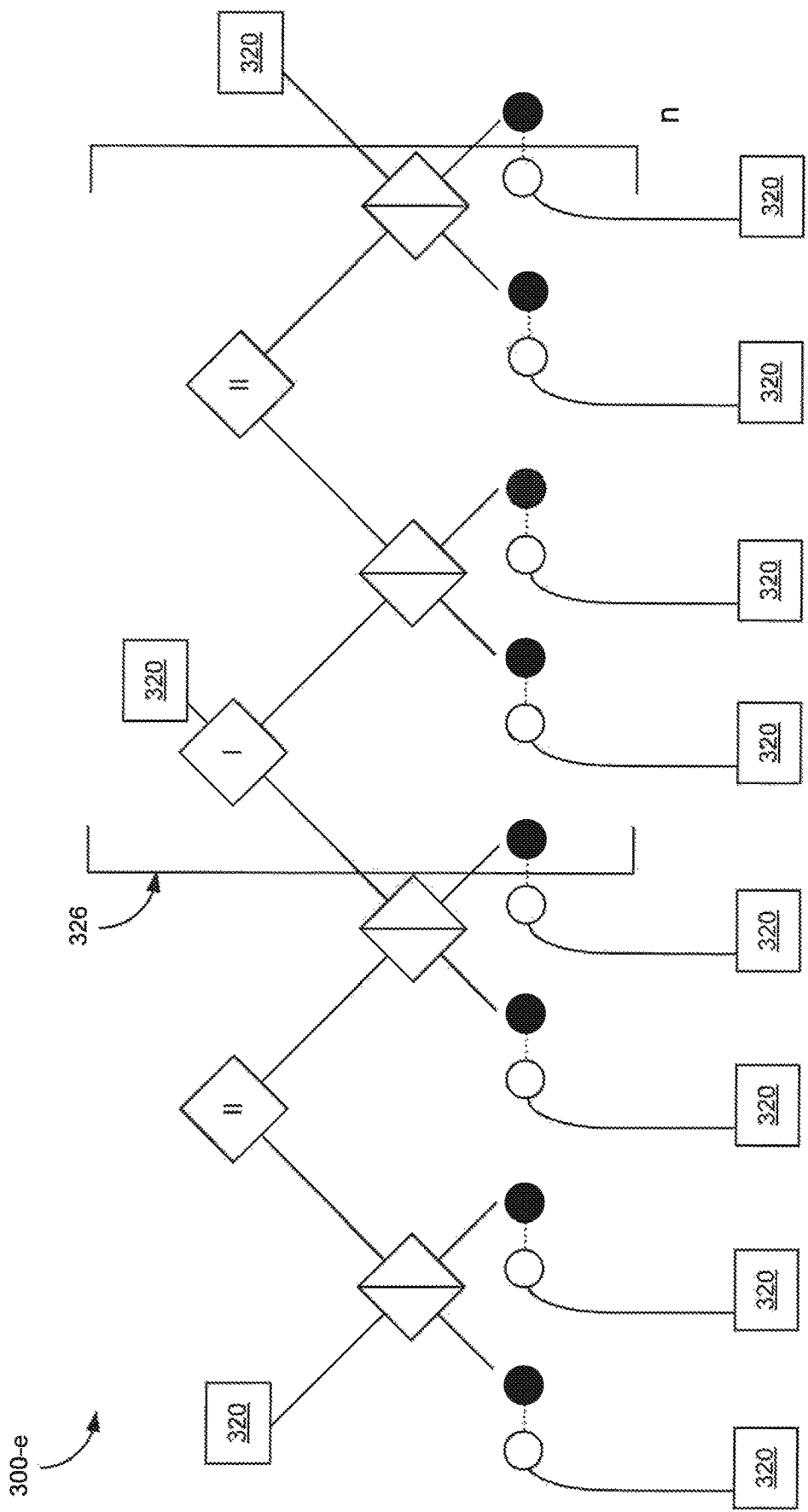

FIG. 3H is a schematic diagram of a device 300-e for generating entangled qubit states in accordance with some embodiments. Device 300-e is analogous to device 300-d (FIGS. 3F-3G) except that FIG. 3H includes a repeating unit 326 which is repeated n times, where n is greater than or equal to 1. The repeating unit comprises a Type-I fusion gate and a Type-II fusion gate (along with their inputs and outputs, as previously described), such that each Type-I fusion gate is sandwiched between two Type-II fusion gates in the repeating structure.

Device 300-e probabilistically generates a (4(n+1)+n+2)-photon GHZ state from 4(n+1) Bell pairs (i.e., 8(n+1) photons). When successful, the (4(n+1)+n+2)-photon GHZ state includes a photon at each output channel 320. The photon at each output channel 320 is entangled with the photon at each other output channel 320 of device 300-e such that the output photons are in a GHZ state (e.g., the set of output photons is in a maximally-entangled state).

Device 300-d is an example of device 300-e with n=1. Thus, FIG. 3H illustrates that device 300-d can be extended to form an arbitrarily large GHZ state (e.g., a GHZ state having an arbitrarily large odd number of photons), albeit with decreasing probability of success as the size of the GHZ state increases (e.g., because the outcomes measured by each of the fusion gates must be indicative of success, which becomes less likely as there are more and more fusion gates).

Figure 4A:
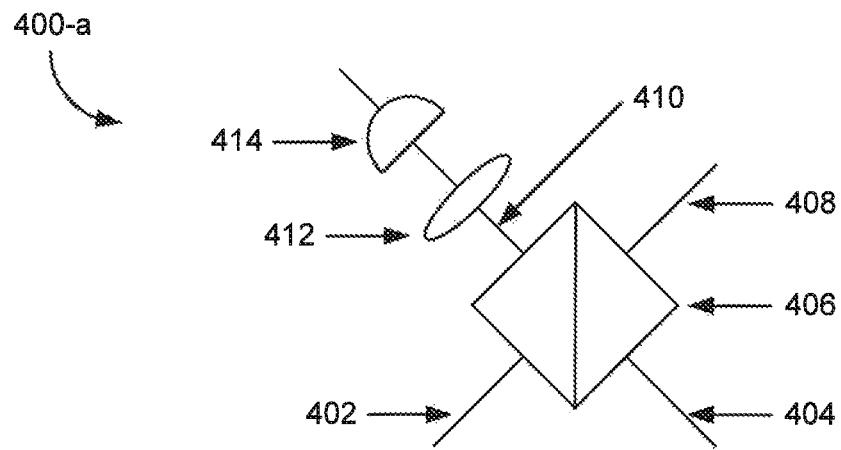
FIGS. 4A-4B are schematic diagrams illustrating fusion gates, in accordance with some embodiments.
Figure 4B:
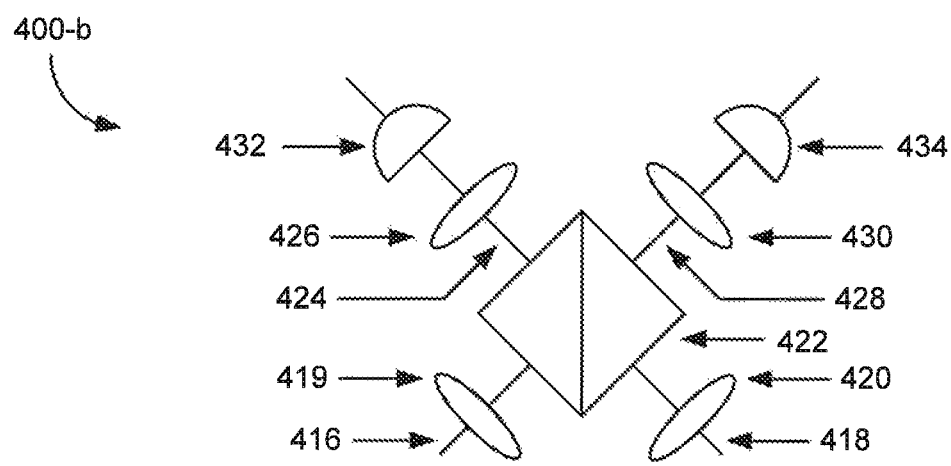

FIGS. 4A-4B are schematic diagrams illustrating fusion gates, in accordance with some embodiments. The fusion mechanisms provided by these fusions gates allow for the construction of entangled qubit states (e.g., cluster states). These fusion gates have the advantage that they do not require elaborate interferometers with multiple beam-splitters in series. Further, these fusion gates make use of Hong-On-Mandel (HOM) effects and therefore require stability only over the coherence length of the photons rather than requiring phase stability of a Mach-Zehnder-type interferometer (MZI), as some previous entanglement schemes have required.

Figure 11:
FIG. 11 illustrates a mapping between photonic components for use in the polarization encoding and for use in the path encoding, in accordance with some embodiments.

FIGS. 4A-4B show Type-1 and Type-2 fusion gates in the polarization encoding in accordance with some embodiments. However, one of ordinary skill will appreciate that the disclosure is not limited to the polarization encoding and any type of encoding can be employed, e.g., path encoding, dual rail encoding, or any other encoding, without departing from the scope of the present disclosure. While one of ordinary skill will be familiar with the mapping between polarization and path encoding, for convenience, FIG. 11 is provided herein to show an illustrative mapping between system components in the polarization-encoded scheme and system components in the path-encoded scheme. Such a mapping can be applied to any of the polarization encoded devices, systems, and methods described herein, not just the fusion gates described herein. Furthermore, in accordance with one or more embodiments qubit states can be rotated using one or more Hadamard gates which can be implemented a number of different ways as described in FIG. 9. In the examples described below, Hadamard-like rotations on qubits are described using the language of polarization encoding and are thus polarization rotators but embodiments of the present disclosure are not limited to merely a polarization encoding representation of the Hadamard gate.

FIG. 4A illustrates a photonic Type-I fusion gate 400-a (in the polarization encoding), in accordance with some embodiments. In general, a Type-I fusion gate is a device that receives, as a first input at input channel 402, a first qubit (e.g., a first photonic qubit) from a first qubit cluster and receives, as a second input at second input channel 404, a second qubit from a second qubit cluster. Examples of qubit clusters include, e.g., a multi-photon state that includes entanglement between two or more photonic qubits (such as a Bell state or GHZ state, or larger entangled state), or a multi-qubit entangled state comprising one or more matter-based qubits, e.g., ion and the like, that are entangled with one or more photons or other matter-based qubits. A Type-I fusion gate performs one or more operations on input qubits of the input clusters to generate entanglement between the previously unentangled qubit clusters. Success of the fusion gate, i.e., the creation of the desired entanglement between the input qubit clusters, is heralded by the detection of a certain number of qubits by the detector 414. More specifically, a Type-I fusion gate, when successful, measures a single measurement qubit at detector 414 and outputs a single output qubit (at output channel 408) that has inherited all of the entangling bonds of the input qubits. More specifically, following the measurement of the single measurement qubit (e.g., when successful), the first qubit cluster and the second qubit cluster are respectively entangled with the single output qubit (e.g., the single output qubit is entangled with one or more qubits from the first qubit cluster and entangled with one or more qubits from the second qubit cluster, providing an entangling bond between the first qubit cluster and the second qubit cluster). Measurement of a single-qubit (e.g., only one photon) by the Type-I fusion gate heralds the success of the Type-I fusion gate (e.g., indicates that the first qubit cluster and the second qubit cluster are entangled).

Returning to FIGS. 4A, Type-I fusion gate 400-a is coupled with a first input channel 402 and a second input channel 404. The Type-I fusion gate 400-a further includes a beam splitter 406 (e.g., a polarizing beam splitter); a first output channel 408; a second output channel 410 which passes through a polarization rotator 412 (e.g., a 45-degree polarization rotator); and a detector 414.

Type-I fusion gate 400-a receives a qubit (e.g., a first qubit) via first input channel 402 and a qubit (e.g., a second qubit) via second input channel 404. The Type-I fusion gate 400-a swaps some of the constituent modes of the input two qubits (e.g., the horizontally polarized mode of the first qubit can be swapped with the horizontally polarized mode of the second qubit thereby forming a new qubit) using the polarizing beam splitter (PBS) 406. Any qubits output on output channel 410 will pass through polarization rotator 412 and will have their polarizations rotated, e.g., by 45 degrees (thereby eliminating the possibility that a detection of a qubit at the detector 414 can provide a determination that the qubit originated from input 402 or 404. The Type-I fusion gate 400-a measures any polarization rotated qubits received from output channel 410 with a qubit counter. The Type-I fusion gate 400-a succeeds when one qubit (either horizontally or vertically polarized) is detected (e.g., which happens 50% of the time) and fails when zero or two qubits are detected.

When the Type-I fusion gate 400-*a* succeeds, the two input qubits are said to be "fused" into a single output qubit that inherits all the bonds from the input qubits. More precisely, the output qubit is formed from one mode from each of the individual input qubits but application of the polarization beam splitter and polarization rotators eliminate the possibility of knowing which qubit contributed which mode, so for simplicity we refer to the output qubit as a new "output qubit." When the Type-I fusion gate 400-*a* fails, e.g., when two qubits are detected by the detector 414, no output qubit is be generated and the Type-I fusion gate 400-*a* has the effect of measuring both input qubits in the computational basis.

FIG. 4B illustrates a Type-II fusion gate 400-*b*, in accordance with some embodiments. A Type-II fusion gate is a device that receives, as a first input, a first qubit from a first qubit cluster and receives, as a second input, a second qubit from a second qubit cluster. The Type-II fusion gate makes use of redundant encoding, whereby a single logical qubit is represented by multiple constituent qubits (thus measurement, in the computational basis, of the qubits provided the Type-II fusion gate does not destroy the encoding of the qubit).

The first input qubit (input on input channel 416) can be entangled with a respective qubit from the first qubit cluster and the second input qubit (in put on input channel 418) can be entangled with a respective qubit from the second qubit cluster. A Type-II fusion gate performs one or more operations on the input qubits (e.g., swaps modes the two qubits). A Type-II fusion gate includes two distinct detectors that (when successful) each measures a single-qubit that is provided to the Type-IT fusion gate. Following the measurement of the both qubits, when successful, the first qubit cluster and the second qubit cluster are entangled through the respective qubits from the first qubit cluster and the second qubit cluster. For example, the respective qubit from the first qubit cluster is entangled with one or more other qubits from the first qubit cluster and the respective qubit from the second qubit cluster is entangled with one or more qubits from the second qubit cluster. Since the respective qubit from the first qubit cluster is also entangled with the respective qubit from the second qubit cluster, the respective qubits provide a "bond" between the first qubit cluster and the second qubit cluster).

Measuring one (and only one) qubit at each detector heralds the success of the Type-II fusion gate (e.g., the measurement indicates that the first qubit cluster and the second qubit cluster are entangled, or "fused"). Thus, since two qubits are provided to the Type-II fusion gate, and each qubit is detected by a distinct detector when successful, the Type-II fusion gate has the additional advantage that it does not require qubit-number discriminating detectors (e.g., detection of zero qubits at one detector implies detection of two qubits at the other, so there is no need to distinguish between detector of one qubit and detection of two qubits).

To that end, the Type-II fusion gate 400-*b* is coupled with a first input channel 416 of the Type-II fusion gate 400-*b* and a second input channel 418 of the Type-II fusion gate 400-*b*. The Type-II fusion gate 400-*b* further includes polarization rotators 419 and 420, corresponding to first input channel 416 and second input channel 418, respectively.

The Type-II fusion gate 400-*b* further includes a beam splitter 422 (e.g., a polarizing beam splitter); a first output channel 424 which passes through a polarization rotator 426 (e.g., a 45-degree polarization rotator); a second output channel 428 which passes through a polarization rotator 430 (e.g., a 45 degree polarization rotator); and detectors 432 and 434, corresponding to first output channel 424 and second output channel 428, respectively.

The Type-II fusion gate 400-*b* receives a qubit (e.g., a first qubit) via first input channel 416 and a qubit (e.g., a second qubit) via second input channel 418. Type-II fusion gate 400-*b* rotates the state (e.g., via a polarization rotation) of the qubits using polarization rotators 419 and 420, mixes the qubits using polarizing beam splitter 422, rotates the polarization of the qubits again using polarization rotators 426 and 430, and then measures the qubits in the rotated basis. The Type-II fusion gate 400-*b* is successful when a single qubit is detected at each detector 432 and 434. Its effect is to project a pair of logical qubits into a maximally-entangled state. When the gate fails, the Type-II fusion gate 400-*b* measures zero or two qubits in one of the detectors 432 and 434 (thus, no qubit detection in either of detector 432 or 434 is indicative of failure). The effect of a failure is to perform a measurement in a computational basis of each of the qubits, removing them from the redundant encoding but not destroying the logical qubit.

FIG. 5 is a schematic diagram illustrating an integrated photonics mode coupler 500 (e.g., a directional coupler also referred to herein as a beamsplitter), in accordance with some embodiments. Mode coupler 500 includes a first channel 502-*a* and a second channel 502-*b* (e.g., formed photolithographically as waveguides on a silica chip). Thus, in some embodiments, mode coupler 500 (as well as other optical components described herein) is implemented using integrated optics. In contrast to bulk optics, which are inherently non-scalable and unreliable on a large scale, integrated optics provide stability and control over the optical path length, with the added advantage that the device size is dramatically reduced as compared to analogous circuits constructed using bulk optics.

Mode coupler 500 is realized by positioning a portion of first channel (mode) 502-*a* and second channel (mode) 502-*b* closely enough so that the evanescent field of a photon in one mode couples to the other mode (and vice-versa). By controlling the separation between the waveguides (modes) and/or the length of the coupling region, different split ratios can be obtained.

As shown in FIG. 11, the photonic mode coupler shown in FIG. 5 is equivalent to a polarization rotator in the polarization encoding devices and systems. As used herein, structures like the mode coupler 500 are referred to as beamsplitters when implemented in a path encoded device. Likewise, as used herein, the term beamsplitter also includes the polarization beamsplitters described in the context of the polarization encoding. Thus, the use of the term "beamsplitter" herein includes a broad class of components that includes components that provide mode swap functionality (as in the case for the polarization beam splitter in the polarization encoding) and also includes mode coupling functionality (as in the case of a photonic beam splitter in the path encoding). The correspondence between the components in the different encodings is well understood in the art and is further summarized in FIG. 11.

Figure 6:
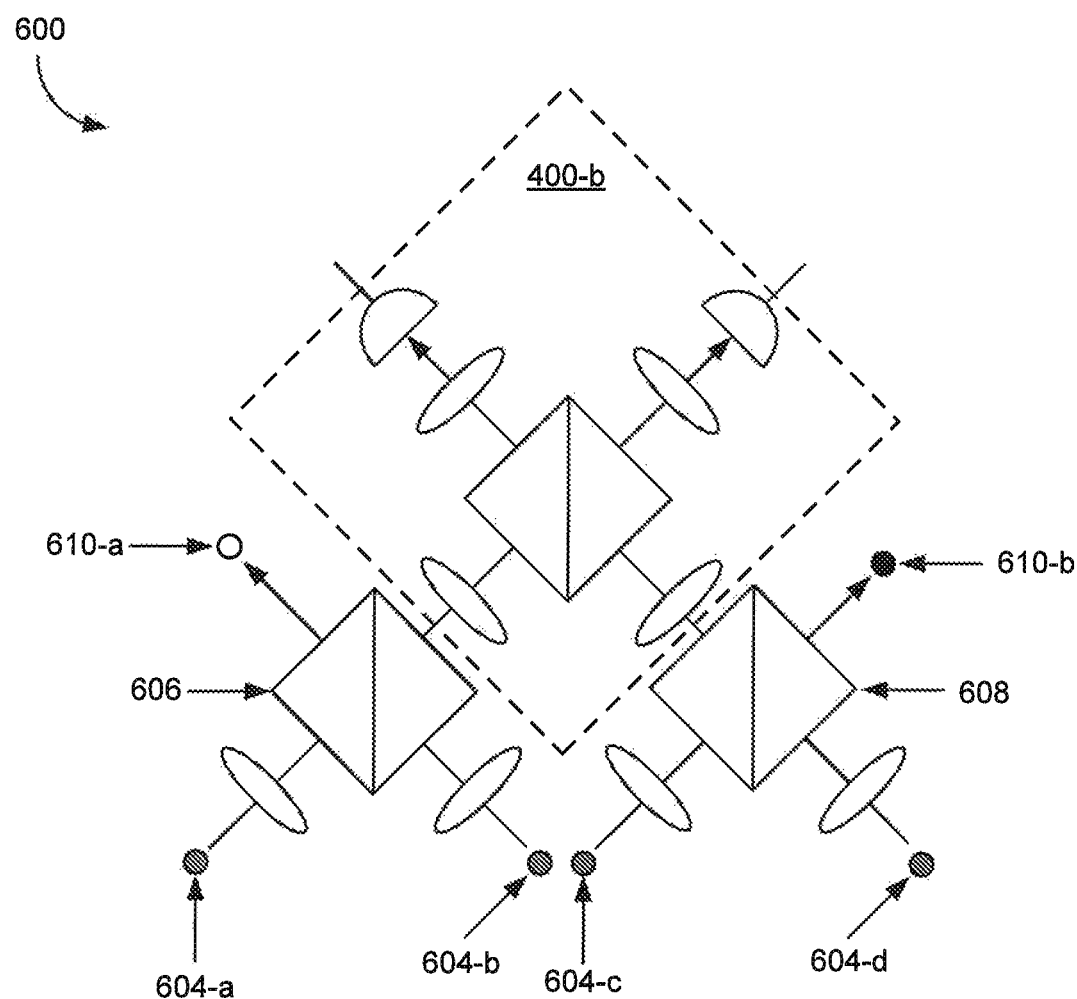
FIG. 6 is a schematic diagram illustrating a device for generating Bell pairs, in accordance with some embodiments.

FIG. 6 is a schematic diagram illustrating a device 600 for generating Bell pairs (i.e., maximally entangled states of two qubits), in accordance with some embodiments. For simplicity, aspects of FIG. 6 described elsewhere in this document are not described again here. Device 600 is represented here as a device that employs photonic qubits in the polarization encoding but one or ordinary skill will recognize that any encoding can be used, e.g., path encoding, without departing from the scope of the present disclosure. Device 600 receives a plurality of photons 604 (e.g., four photons 604-*a* through 604-*d*). In some embodiments, the photons 604 are received from single photon sources. Photons 604-*a* and 604-*b* are mixed using a beam splitter 606, with appropriate polarization rotation. Photons 604-*c* and 604-*d* are mixed using a beam splitter 608, with appropriate polarization rotation. A photon 610-*a* is output from beam splitter 606 and a photon 610-*b* is output from beam splitter 608. Another photon from each of beam splitter 606 and beam splitter 608 is applied to a Type-II fusion gate 400-*b*, as described above. The Type-II fusion gate 400-*b* determines whether photon 610-*a* and photon 610-*b* are entangled in a Bell state. Thus, when successful, photon 610-*a* and photon 610-*b* can be output as an entangled Bell state (e.g., photon 610-*a* can be used as a first photon in FIGS. 3A-3H and photon 610-*b* can be used as a second photon in FIGS. 3A-3H).

Figure 7B:
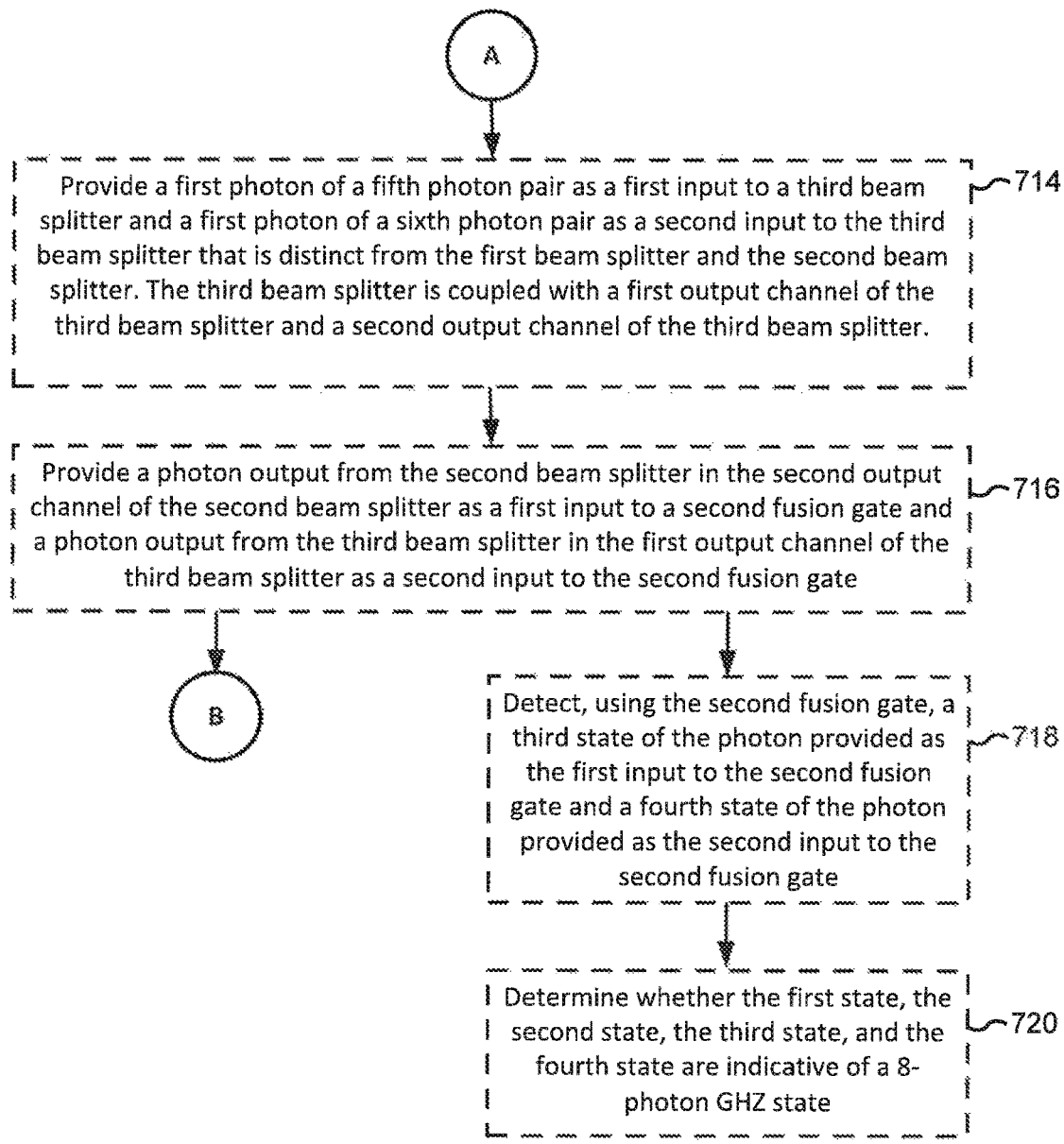

FIGS. 7A-7C illustrate a flow chart for a method 700 of generating entangled qubit states, in accordance with some embodiments. In some embodiments, the entangled qubit states are maximally entangled (e.g., GHZ states). In some embodiments, the entangled qubit states are used as resources in a quantum computing architecture (e.g., as an algorithmic resource or a precursor resource from which larger resources are built up).

The method 700 includes receiving (702) a plurality of photon pairs (e.g., photon pairs 308, FIGS. 3A-3H). Each photon pair is in a Bell state and includes a first photon and a second photon that is distinct and separate from the first photon. A Bell pair is a pair of qubits in a Bell state (e.g., any Bell state). In some embodiments, the Bell states are the maximally-entangled quantum states of a pair of qubits.

In some embodiments, each photon pair is a two-photon polarization-entangled pair (e.g., each photon represents a qubit encoded in the photon's polarization degree of freedom). For example, the computational basis for the qubit is a vertical polarization v of the photon and a horizontal polarization h of the photon, and the two photons in the Bell pair are entangled in this computational basis. In this basis, for two photons, there are four Bell states:

$$|\Phi^+\rangle = \frac{|h\rangle|h\rangle + |v\rangle|v\rangle}{\sqrt{2}} \quad (10)$$

$$|\Phi^-\rangle = \frac{|h\rangle|h\rangle - |v\rangle|v\rangle}{\sqrt{2}} \quad (11)$$

$$|\Psi^+\rangle = \frac{|h\rangle|v\rangle + |v\rangle|h\rangle}{\sqrt{2}} \quad (12)$$

$$|\Psi^-\rangle = \frac{|h\rangle|v\rangle - |v\rangle|h\rangle}{\sqrt{2}} \quad (13)$$

The method 700 includes obtaining a plurality of photons comprising at least six photons in a Greenberger-Horn-Zeilinger (GHZ) state (e.g., entangled in a polarization degree of freedom of the photons) by providing photons of the plurality of photon pairs to a plurality of beam splitters (e.g., as described with reference to the operations 704, 706, and optionally operations 714 and 722, described below). In some embodiments, the method 700 includes attempting to obtain a plurality of photons comprising at least six photons in a Greenberger-Horn-Zeilinger (GHZ) state, and the method 700 produces the at least six photons as well as information indicating whether the GHZ state generation was successful (e.g., whether the at least six photons are in a Greenberger-Horn-Zeilinger (GHZ) state). Thus, the at least six photons in the GHZ state are heralded as being in the GHZ state.

In a computational basis with two states, a Greenberger-Horne-Zeilinger state is a quantum superposition of all qubits being in a first state of the two states superposed with all of qubits being in a second state. Using photon polarization as the computational basis, the general M-photon GHZ state can be written as:

$$|GHZ\rangle = \frac{|h\rangle^{\otimes M} + |v\rangle^{\otimes M}}{\sqrt{2}} \quad (14)$$

The method 700 includes providing (704) a first photon of a first photon pair as a first input to a first beam splitter (e.g., via first input channel 304-*a* of first beam splitter 302-*a*, FIGS. 3A-3H) and a first photon of a second photon pair as a second input to the first beam splitter (e.g., via second input channel 306-*a* of first beam splitter 302-*a*, FIGS. 3A-3H). The first beam splitter is coupled with a first output channel of the first beam splitter (e.g., first output channel 310-*a*, FIGS. 3A-3H) and a second output channel of the first beam splitter (e.g., second output channel 312-*a*, FIGS. 3A-3H). In some embodiments, the first beam splitter is a polarizing beam splitter (PBS) (e.g., as described with reference to FIG. 5). In some embodiments, a polarizing beam splitter operates on one or more photons in a first channel having a first polarization (e.g., a horizontal polarization) by maintaining the one or more photons in the first channel (e.g., transfers the one or more photons from an input channel to a corresponding output channel that is a waveguide continuation of the input channel). In some embodiments, a polarizing beam splitter operates on one or more photons in a first channel having a second polarization (e.g., a vertical polarization) by transferring the one or more photons in to a second channel distinct from the first channel (e.g., transfers the one or more photons from an input channel to an output channel that is not a waveguide continuation of the input channel).

Thus, in some embodiments, the operation of the polarizing beam splitter can be written as follows:

$$S|h,0\rangle_i = |h,0\rangle_o \quad (15)$$

$$S|v,0\rangle_i = |0,v\rangle_o \quad (16)$$

$$S|0,h\rangle_i = |0,h\rangle_o \quad (17)$$

$$S|0,v\rangle_i = |v,0\rangle_o \quad (18)$$

In Equations ((15)-(18) above, the operator S represents the operation of the polarizing beam splitter, the first value a in the ket $|a, b\rangle_i$ represents a polarization of a photon in the first input channel of the polarizing beam splitter (e.g., a=h represents a horizontally-polarized photon in the first input channel of the polarizing beam splitter, a=v represents a vertically-polarized photon in the first input channel of the polarizing beam splitter, and a=0 represents zero photons in the first input channel of the polarizing beam splitter), the second value b in the ket $|a, b\rangle_i$ represents a polarization of a photon in the first input channel of the polarizing beam splitter, the third value c in the ket $|c, d\rangle_o$ represents a polarization of a photon in the first output channel of the polarizing beam splitter, and the fourth value d in the ket $|c, d\rangle_o$ represents a polarization of a photon in the second output channel of the polarizing beam splitter. Thus, as used herein, a comma within a ket separates a photon's state with respect to plurality of channels whereas multiple kets are used to signify different photons.

In some embodiments, the first photon from the first photon pair and the first photon from the second photon pair are provided in a first polarization (e.g., a horizontal polarization or a vertical polarization). In some embodiments, the polarization of the first photon from the first photon pair and the first photon from the second photon pair are rotated (e.g., by 45 degrees) before entering the first beam splitter (e.g., the first input channel of the first beam splitter and the second input channel of the first beam splitter include or are acted upon by a polarization rotator). In some embodiments, the polarization of the first photon from the first photon pair and the first photon from the second photon pair are rotated (e.g., by 45 degrees) after exiting the first beam splitter (e.g., the first output channel of the first beam splitter and the second output channel of the first beam splitter include or are acted upon by a polarization rotator).

In some embodiments, the polarizations are rotated using a polarization rotator. The operation of a 45-degree polarization rotator, for example, can be written as follows:

$$R|h\rangle = \frac{|h\rangle + |v\rangle}{\sqrt{2}} \qquad (19)$$

$$R|v\rangle = \frac{|v\rangle + |h\rangle}{\sqrt{2}} \qquad (20)$$

In Equations (19)-(20) above, the operator R represents the operation of the 45 degree polarization rotator.

The method 700 includes providing (706) a first photon of a third photon pair as a first input to a second beam splitter (e.g., via first input channel 304-b of second beam splitter 302-b, FIGS. 3A-H) and a first photon of a fourth photon pair as a second input to the second beam splitter (e.g., via second input channel 306-b of second beam splitter 302-b, FIGS. 3A-3H). The second beam splitter is distinct from the first beam splitter. In some embodiments, the second beam splitter is a polarizing beam splitter. The second beam splitter is coupled with a first output channel of the second beam splitter (e.g., first output channel 310-b, FIGS. 3A-3H) and a second output channel of the second beam splitter (e.g., second output channel 312-b, FIGS. 3A-3H). In some embodiments, the polarization of the first photon from the third photon pair and the first photon from the fourth photon pair are rotated (e.g., by 45 degrees) before entering the second beam splitter (e.g., the first input channel of the second beam splitter and the second input channel of the second beam splitter include or are acted upon by a polarization rotator). In some embodiments, the polarization of the first photon from the third photon pair and the first photon from the fourth photon pair are rotated (e.g., by 45 degrees) after exiting the second beam splitter (e.g., the first output channel of the second beam splitter and the second output channel of the second beam splitter include or are acted upon by a polarization rotator).

The method 700 includes providing (708) a photon output from the first beam splitter in the second output channel of the first beam splitter as a first input to a first fusion gate (e.g., first fusion gate 314-a, FIGS. 3A-3H) and a photon output from the second beam splitter in the first output channel of the second beam splitter as a second input to the first fusion gate.

In some embodiments, method 700 includes determining whether success criteria are met (e.g., GHZ generation success criteria indicating that the desired entangled state has been generated). In some embodiments, determining whether the success criteria are met includes detecting a state of one or more photons provided to one or more fusion gates (e.g., where the photon's state includes its presence in a particular channel and/or the photon's polarization). In some embodiments, the method 700 includes detecting (710), using the first fusion gate, a first state of the photon provided as the first input to the first fusion gate and a second state of the photon provided as the second input to the first fusion gate (e.g., the first fusion gate is a Type-II fusion gate). The first state of the photon provided as the first input to the first fusion gate and the second state of the photon provided as the second input to the first fusion gate herald the success or failure of the first fusion gate's operation. In some embodiments (e.g., when the device includes a plurality of fusion gates, the success criteria include detection of only one photon at each detector of each fusion gate of the device).

In some embodiments, detecting the first state includes detecting a photon in a first output channel of the first fusion gate (e.g., the state is or includes the photon's presence in the first output channel) and detecting the second state includes detecting a photon in a second output channel of the first fusion gate (e.g., the state is or includes the photon's presence in the first output channel). To that end, in some embodiments, the first fusion gate includes a first detector and a second detector that is distinct and separate from the first detector. Detecting operation 710 includes (e.g., when successful): detecting, using the first detector of the first fusion gate, only one photon selected from the photon provided as the first input to the first fusion gate and the photon provided as the second input to the first fusion gate; and detecting, using the second detector of the first fusion gate, only another photon selected from the photon provided as the first input to the first fusion gate and the photon provided as the second input to the first fusion gate. In some embodiments, when the first detector detects both photons (e.g., and the second detector detects zero photons) or the second detector detects both photons (e.g., and the first detector detects zero photons), the method 700 includes determining that the attempt to prepare the GHZ state has failed (e.g., the success criteria are not met).

For example, in some embodiments, the GHZ state is a 6-photon GHZ state produced using 4 pairs of photons in a Bell state. In some embodiments, the method 700 includes determining (712) whether the first state and the second state are indicative of a 6-photon GHZ state. The remaining photons comprise the 6 photons in the 6-photon GHZ state. For example, the plurality of photons in the GHZ state includes: second photons of: the first photon pair, the second photon pair, the third photon pair, and the fourth photon pair, one photon output from the first beam splitter in the first output channel of the first beam splitter; and one photon output from the second beam splitter in the second output channel of the second beam splitter.

In some embodiments, the method 700 includes providing (714) a first photon of a fifth photon pair as a first input to a third beam splitter (e.g., via first input channel 304-c of third beam splitter 302-c, FIGS. 3C-3H) and a first photon of a sixth photon pair as a second input to the third beam splitter (e.g., via second input channel 306-c of third beam splitter 302-c, FIGS. 3C-3H). The third beam splitter is distinct from the first beam splitter and the second beam splitter. The third beam splitter is coupled with a first output channel of the third beam splitter (e.g., first output channel 310-c, FIGS. 3C-3H) and a second output channel of the third beam splitter (e.g., second output channel 312-c, FIGS. 3C-3H). In some embodiments, the polarization of the first photon from the fifth photon pair and the first photon from the sixth photon pair are rotated (e.g., by 45 degrees) before entering the third beam splitter (e.g., the first input channel of the third beam splitter and the second input channel of the third beam splitter include or are acted upon by a polarization rotator). In some embodiments, the polarization of the first photon from the fifth photon pair and the first photon from the sixth photon pair are rotated (e.g., by 45 degrees) after exiting the third beam splitter (e.g., the first output channel of the third beam splitter and the second output channel of the third beam splitter include or are acted upon by a polarization rotator).

In some embodiments, the method 700 includes providing (716) a photon output from the second beam splitter in the second output channel of the second beam splitter as a first input to a second fusion gate (e.g., second fusion gate 314-b, FIGS. 3C-3D) and a photon output from the third beam splitter in the first output channel of the third beam splitter as a second input to the second fusion gate.

In some embodiments, the second fusion is a Type-II fusion gate. In some embodiments, the method 700 includes detecting (718), using the second fusion gate, a third state of the photon provided as the first input to the second fusion gate and a fourth state of the photon provided as the second input to the second fusion gate (e.g., using detectors as shown in FIG. 6). The third state of the photon provided as the first input to the second fusion gate and the fourth state of the photon provided as the second input to the second fusion gate herald the success or failure of the second fusion gate's operation.

For example, in some embodiments, the GHZ state is an 8-photon GHZ state produced using 6 pairs of photons in a Bell state. In some embodiments, the method 700 includes determining (720) whether the first state, the second state, the third state, and the fourth state are indicative of an 8-photon GHZ state. The remaining photons comprise the 8 photons in the 8-photon GHZ state. For example, the plurality of photons in the GHZ state includes: second photons of: the first photon pair, the second photon pair, the third photon pair, the fourth photon pair, the fifth photon pair, and the sixth photon pair; one photon output from the first beam splitter in the first output channel of the first beam splitter; and one photon output from the third beam splitter in the second output channel of the third beam splitter.

In some embodiments, the method 700 includes providing (722) a first photon of a seventh photon pair as a first input to a fourth beam splitter (e.g., via first input channel 304-d of fourth beam splitter 302-d, FIG. 3F-3H) and a first photon of an eighth photon pair as a second input to the fourth beam splitter (e.g., via second input channel 306-d of fourth beam splitter 302-d, FIG. 3F-3H). The fourth beam splitter is distinct from the first beam splitter, the second beam splitter, and the third beam splitter. The fourth beam splitter is coupled with a first output channel of the fourth beam splitter (e.g., first output channel 310-d, FIGS. 3F-3H) and a second output channel of the fourth beam splitter (second output channel 312-d, FIGS. 3F-3H). In some embodiments, the polarization of the first photon from the seventh photon pair and the first photon from the eighth photon pair are rotated (e.g., by 45 degrees) before entering the fourth beam splitter (e.g., the first input channel of the fourth beam splitter and the second input channel of the fourth beam splitter include or are acted upon by a polarization rotator).

In some embodiments, the polarization of the first photon from the seventh photon pair and the first photon from the eighth photon pair are rotated (e.g., by 45 degrees) after exiting the fourth beam splitter (e.g., the first output channel of the fourth beam splitter and the second output channel of the fourth beam splitter include or are acted upon by a polarization rotator).

In some embodiments, the method 700 includes providing (724) a photon output from the third beam splitter in the second output channel of the third beam splitter as a first input to a third fusion gate (e.g., second fusion gate 314-c, FIGS. 3F-3H) and a photon output from the fourth beam splitter in the first output channel of the fourth beam splitter as a second input to the third fusion gate.

In some embodiments, the second fusion gate and the third fusion gate are Type-II fusion gates. In some embodiments, the GHZ state is a 10-photon GHZ state produced using 8 pairs of photons in a Bell state. In some embodiments, the second fusion gate is a Type-I fusion gate and the third fusion gate is a Type-II fusion gate. In some embodiments, the GHZ state is an 11-photon GHZ state produced using 8 pairs of photons in a Bell state.

More generally, the GHZ state is an n-photon GHZ state. The first fusion gate is a fusion gate in a plurality of fusion gates (e.g., that includes the second fusion gate and the third fusion gate, described above). The method 700 further includes detecting, using the plurality fusion gates, a state of photons provided to the plurality of fusion gates and determining whether the state of the photons provided to the plurality of fusion gates is indicative of an n-photon GHZ state. In some embodiments, the state of the photons provided to the plurality of fusion gates is indicative of successful generation of the n-photon GHZ state when all of the fusion gates indicate success (e.g., in an analogous manner to the success criteria described above with reference to operation 710).

Figure 8:
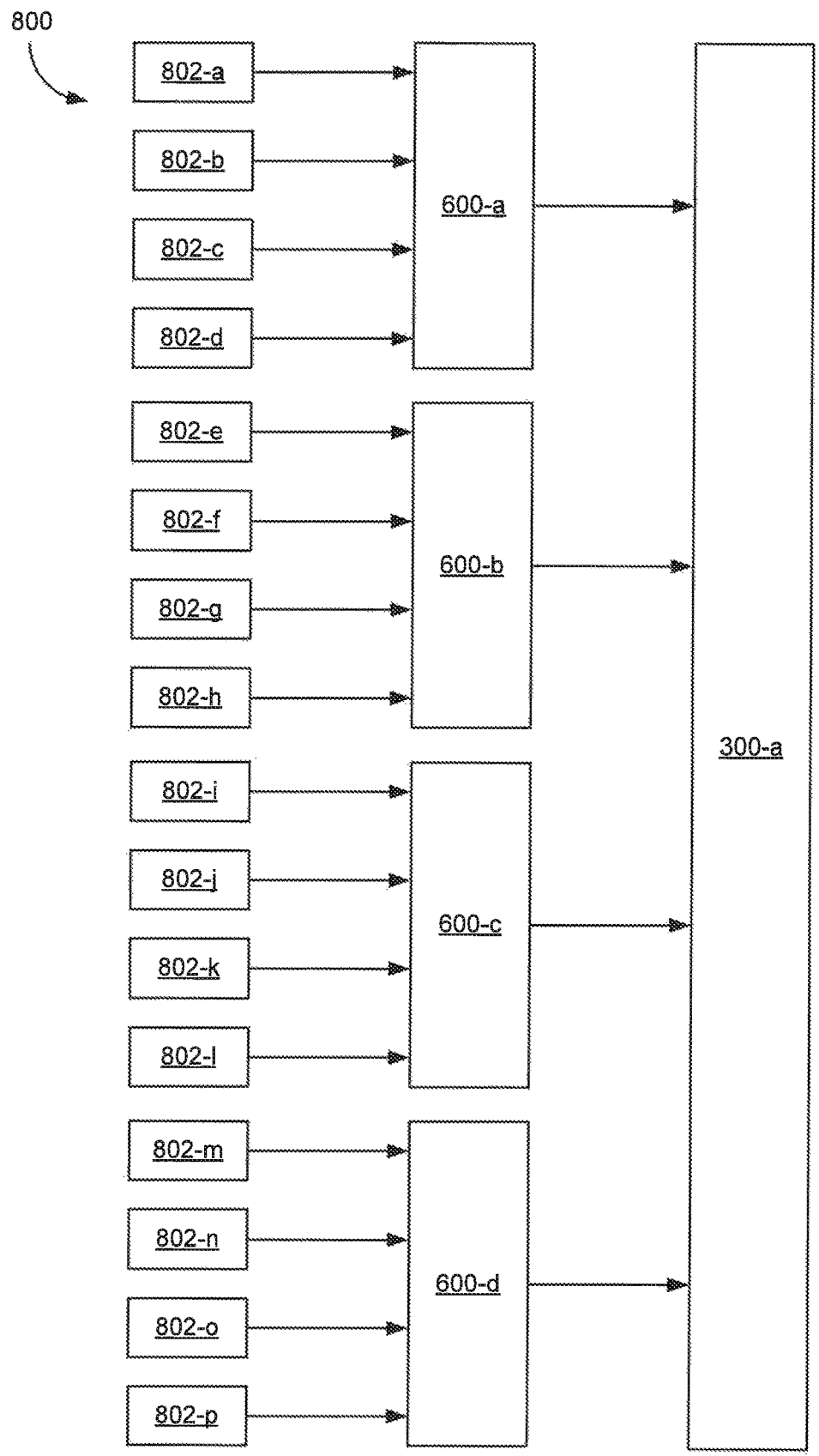
FIG. 8 is a schematic diagram illustrating an architecture of a device for generating entangled qubit states, in accordance with some embodiments.

FIG. 8 is a schematic diagram illustrating an architecture of a device 800 for generating entangled qubit states, e.g., photonic qubit states, in accordance with some embodiments. In some embodiments, a plurality of single photon sources 802 provides single photons to a plurality of Bell pair generators 600. In some embodiments, the single photon sources 802 and/or the Bell pair generators 600 are part of device 800. Alternatively, the single photon sources 802 and/or the Bell pair generators 600 are external to device 800.

For example, four single photon sources 802-a through 802-d provide single photons to Bell pair generator 600-a; four single photon sources 802-e through 802-h provide single photons to Bell pair generator 600-b; four single photon sources 802-i through 802-1 provide single photons to Bell pair generator 600-c; and four single photon sources 802-m through 802-p provide single photons to Bell pair generator 600-d. Bell pair generators 600 generate Bell pairs (e.g., as described with reference to FIG. 6), and in doing so consume two of the four photons provided to each Bell pair generator 600. Thus, each Bell pair generator 600 outputs, when successful, two photons in an entangled Bell state. The Bell pairs from each Bell pair generator is provided to device 300-a, as described with reference to FIGS. 3A-3B, which generates a 6-photon GHZ state from the 4 Bell pairs provided.

It will be apparent to one of skill in the art how to modify device 800 (e.g., with additional photon sources 802 and Bell pair generators) to incorporate other devices 300 besides device 300-a (e.g., any of device 300-b through device 300-e, FIGS. 3C-3H).

IV. Notation

Figure 9:
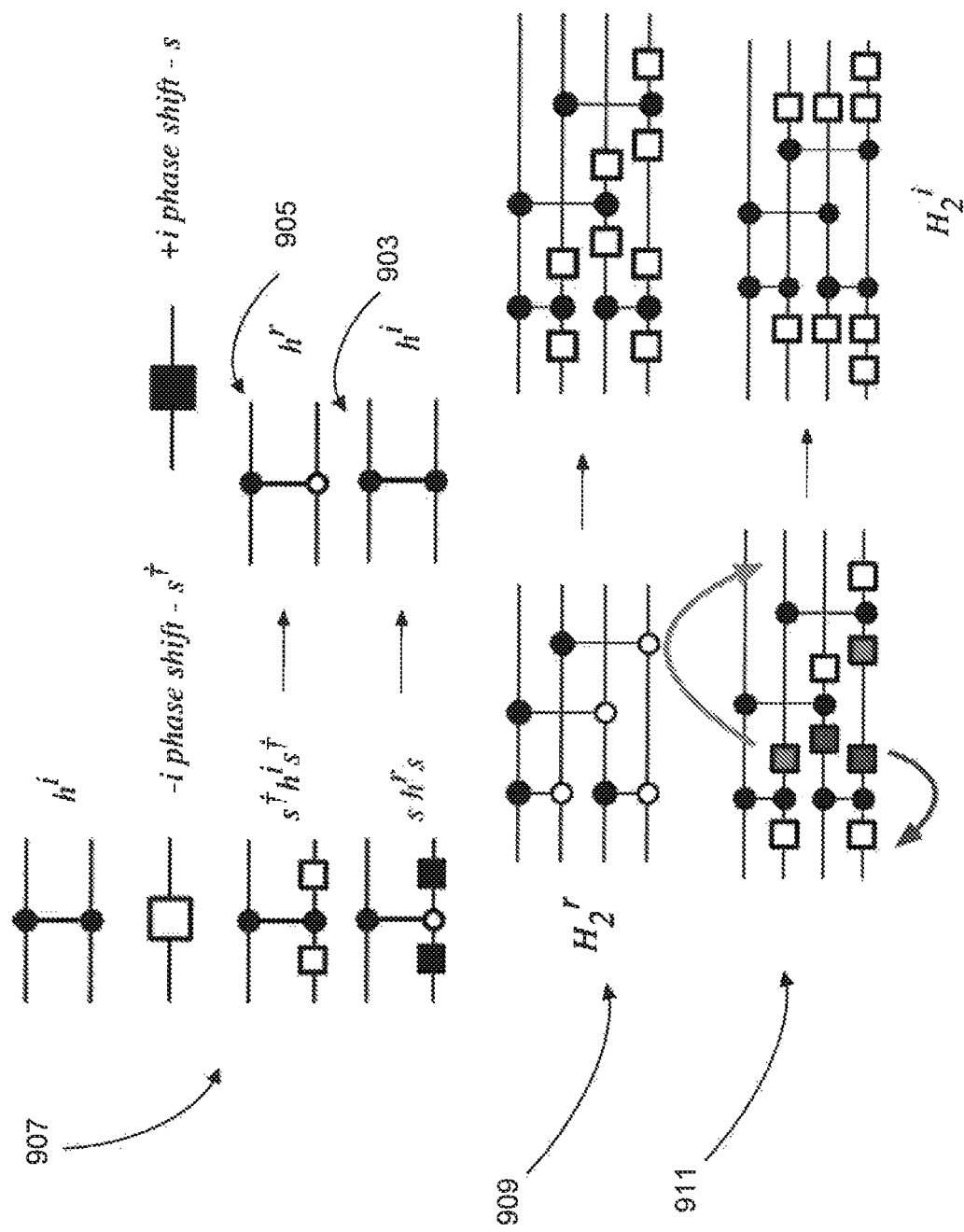
FIG. 9 shows schematic diagrams of beamsplitters and Hadamard gates in accordance with some embodiments.

The schematic diagrams used herein illustrate certain components/quantum gates. FIG. 9 illustrate a simplified notation for some of these components/quantum gates (in particular, beamsplitters and n-mode Hadamards). In general, the definitions and relations between beamsplitters and n-mode Hadamards can be translated to the path-encoded diagrams using the notation shown in FIG. 9. Mathematically, the imaginary Hadamard can be written as $$h^i = \frac{1}{\sqrt{2}} \begin{pmatrix} 1 & i \\ i & 1 \end{pmatrix}$$

and the real Hadamard $h^r$ can be written as $$h^r = \frac{1}{\sqrt{2}} \begin{pmatrix} 1 & 1 \\ 1 & -1 \end{pmatrix}$$

Physically, e.g., in a photonic system, the above Hadamard gates can be implemented as beamsplitters and/or directional couplers. The real and complex Hadamards can be transformed into one another by applying a ±i phase shift to the second mode. The unitary operators that define such a phase shift are given by $$s = \begin{pmatrix} 1 & 0 \\ 0 & i \end{pmatrix} \text{ and } s^\dagger = \begin{pmatrix} 1 & 0 \\ 0 & -i \end{pmatrix},$$

in which case $h^i = s h^r s$ and $h^r = s^\dagger h^i s^\dagger$.

In view of the above mathematical relations, the complex Hadamard corresponds to a real Hadamard preceded and followed by a phase of i on the second mode, and the real Hadamard corresponds to a complex Hadamard preceded and followed by a phase of −i on the second mode. Both matrices are symmetric, but they differ in that $h^i$ applies the same operation to both the modes it acts on, while $h^r$ acts differently on the two modes. This means that, while the order of the input modes is irrelevant when the complex Hadamard is used, it is important if the real version is applied.

The two-mode imaginary Hadamard $h^i$ and the two-mode real Hadamard $h^r$ can be represented schematically as mode couplers 903 and 905, respectively. The transformations between the two are also shown via schematic elements 907, where −i phase shifts applied to a mode are represented by open boxes and i phase shifts applied to a mode are represented by boxes with black fill. As already described above, these mode couplers can be physically implemented as beamsplitters, directional couplers and the like.

The above description for two-mode Hadamard gates can be generalized to n-mode situations. More specifically an n-mode (also referred to herein as an n-th order Hadamard) real/imaginary Hadamard can be expressed as $$H_n^r = h^r \otimes h^r \otimes \ldots \otimes h^r = h^{r \otimes n}$$

$$H_n^i = h^i \otimes h^i \otimes \ldots \otimes h^i = h^{i \otimes n}$$

For example, the 2$^{nd}$ order Hadamards are $$H_2^r = \frac{1}{2} \begin{pmatrix} 1 & 1 & 1 & 1 \\ 1 & -1 & 1 & -1 \\ 1 & 1 & -1 & -1 \\ 1 & -1 & -1 & 1 \end{pmatrix}$$

$$H_2^i = \frac{1}{2} \begin{pmatrix} 1 & i & i & -1 \\ i & 1 & -1 & i \\ i & -1 & 1 & i \\ -1 & i & i & 1 \end{pmatrix}$$

More generally, the 2n×2n Hadamards (real or complex) can be decomposed into products of single beamsplitters using the following formula:

$$H_n^{r(i)} = \prod_{j=1}^{\log_2(N)} \left( \prod_{\substack{i=0 \\ i \bmod 2^j < 2^{j-1}}}^{N-1} h_{i,i+2^{j-1}}^{r(i)} \right)$$

Where N=2$^n$ and the lower indices on $h^{r(i)}$ indicate the modes the beamsplitters act on. For example, expanding this formula gives:

$$H_1^{r(i)} = h_{0,1}^{r(i)} \qquad (2\times2)$$

$$H_2^{r(i)} = h_{0,1}^{r(i)} h_{2,3}^{r(i)} h_{0,2}^{r(i)} h_{1,3}^{r(i)} \qquad (4\times4)$$

$$H_3^{r(i)} = h_{0,1}^{r(i)} h_{2,3}^{r(i)} h_{4,5}^{r(i)} h_{6,7}^{r(i)} h_{0,2}^{r(i)} h_{1,3}^{r(i)} h_{4,6}^{r(i)} h_{5,7}^{r(i)} h_{0,4}^{r(i)} h_{1,5}^{r(i)} h_{2,6}^{r(i)} h_{3,7}^{r(i)} \qquad (8\times8)$$

Schematic diagrams 909 show one example of the real second order Hadamard. Likewise, schematic 911 shows the imaginary second order Hadamard. Also included are the steps by which the real Hadamard can be converted to the imaginary Hadamard.

V. Exemplary Beamsplitters

Figure 10A:
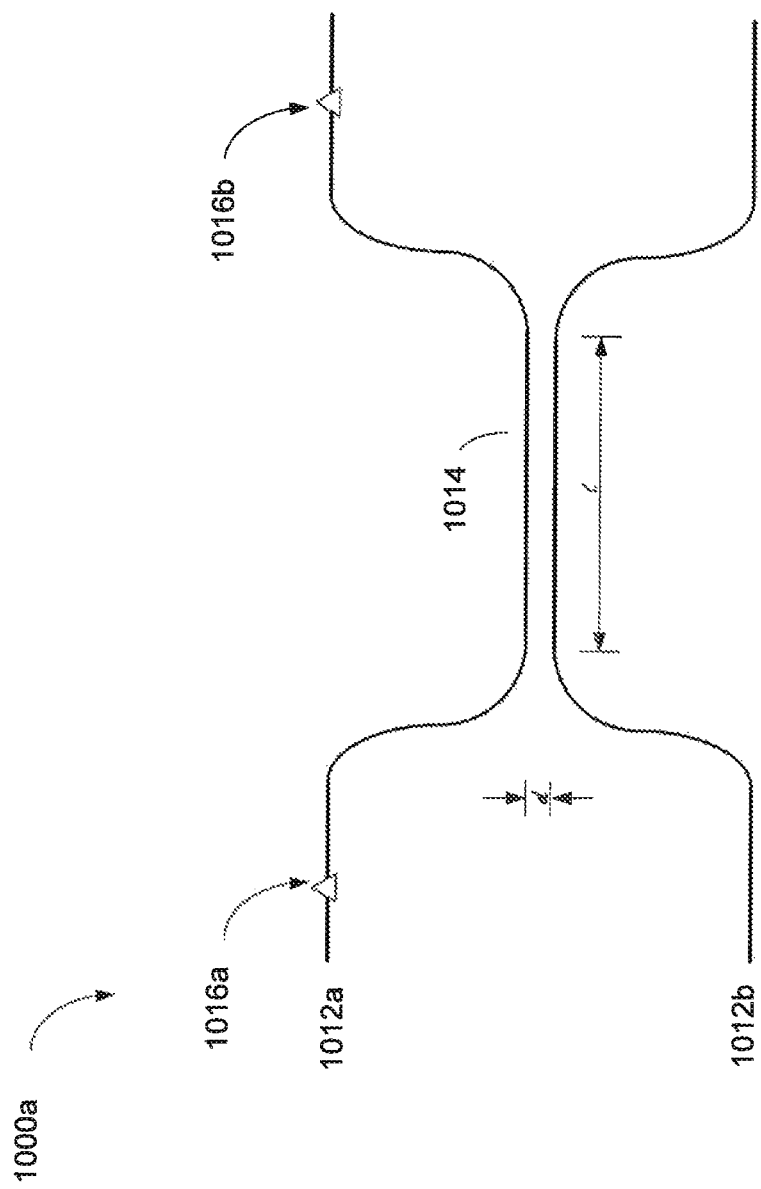
FIGS. 10A-10C illustrate schematic diagrams of waveguide beam splitters, in accordance with some embodiments.
Figure 10B:
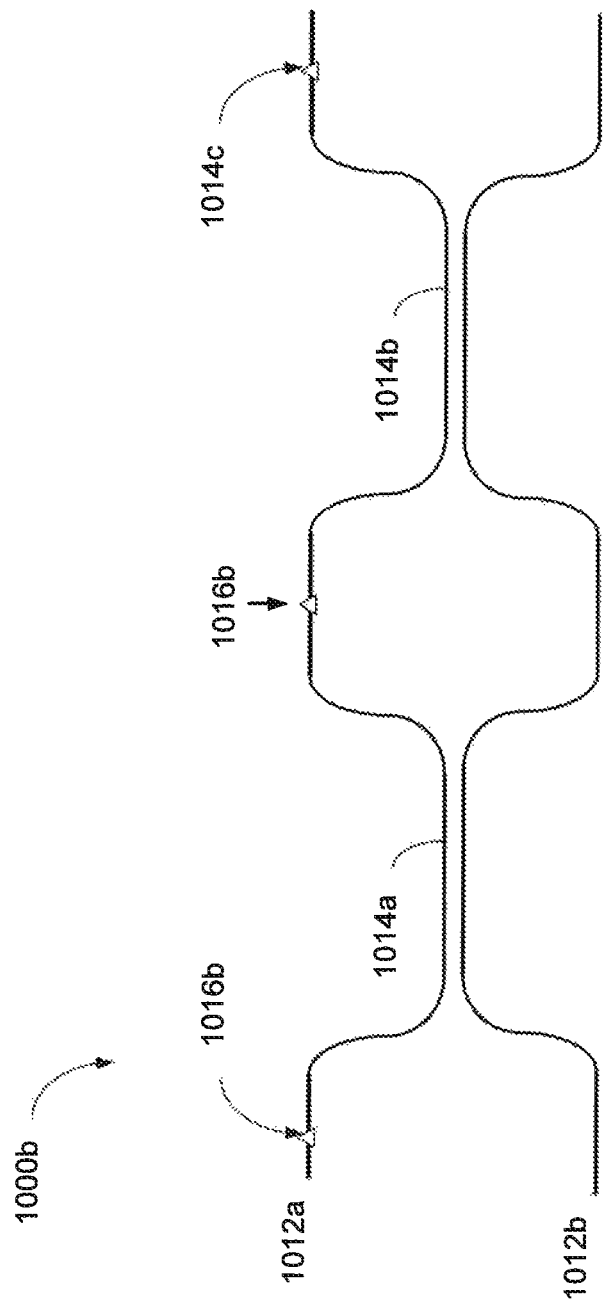
Figure 10C:
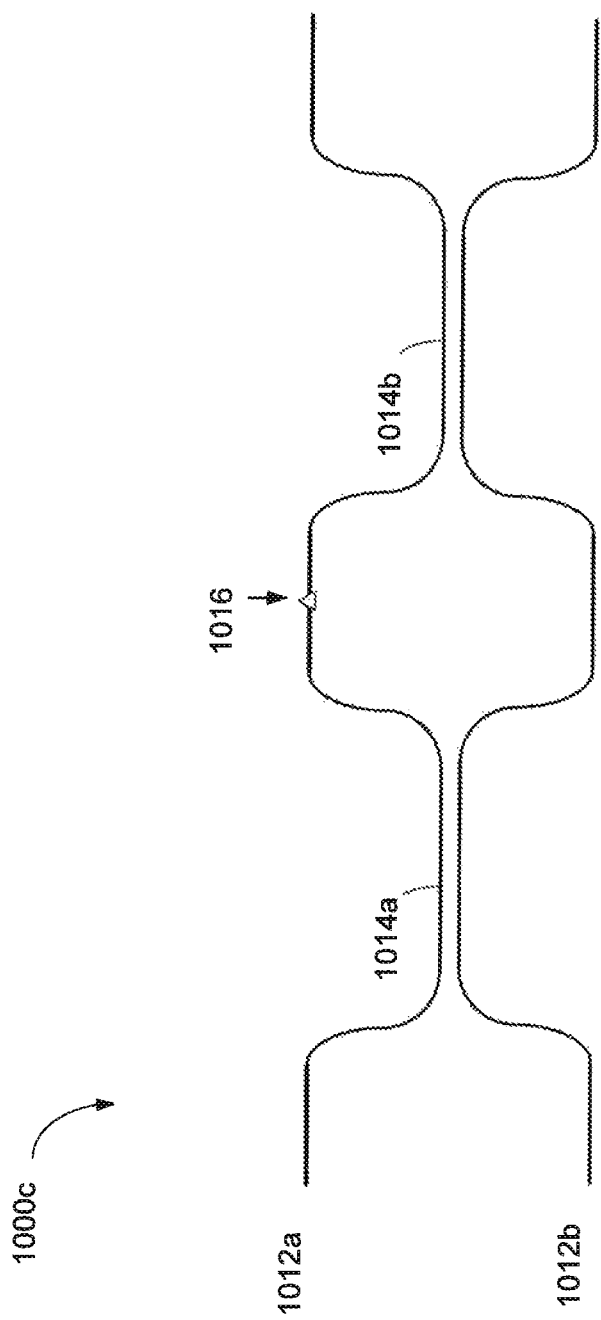

FIGS. 10A-10C illustrate schematic diagrams of waveguide beam splitters 1000 (e.g., 1000a, 1000b, and 1000c, respectively), in accordance with some embodiments. In some embodiments, beam splitters are implemented in integrated photonics via directional couplings, which are realized by bringing together the different waveguides (e.g., waveguides 1012a and 1012b) close enough so that the evanescent field of one of them can couple into the other one. By controlling the separation d between the waveguides 1012 and/or the length l of the coupling region 1014, different transmissivity can be obtained and therefore this implementation is equivalent to a beam-splitter in bulk optics. In this manner, waveguide beam splitter 1000 may be configured to have a transmissivity equal to 0.5 (e.g., a 50:50 beam splitter, greater than 0.6, greater than 0.7, greater than 0.8, or greater than 0.9).

In some embodiments, waveguide beam splitters 1000 include variable phase-shifters 1016. Variable phase-shifters can be implemented in integrated circuits, providing control over the relative phases of the state of a photon spread over multiple modes. For the silica-on-silicon materials some embodiments implement variable phase-shifters using thermo-optical switches. The thermo-optical switches use resistive elements fabricated on the surface of the chip, that via the thermo-optical effect can provide a change of the refractive index n by raising the temperature of the waveguide 1012 by an amount of the order of $10^{-5}$K. One of skill in the art, however, having had the benefit of this disclosure, will understand that any effect that changes the refractive index of a portion of the waveguide can be used to generate a variable, electrically tunable, phase shift. For example, some embodiments use beam splitters based on any material that supports an electro-optic effect, so-called $\chi^2$ and $\chi^3$ materials such as lithium niobite, BBO, KTP, and the like and even doped semiconductors such as silicon, germanium, and the like.

Beam-splitters with variable transmissivity and arbitrary phase relationships between output modes can also be achieved by combining directional couplings and variable phase-shifters in a Mach-Zehnder Interferometer (MZI) configuration, e.g., as shown in FIG. 10B. Complete control over the relative phase and amplitude of the two paths in dual rail encoding can be achieved by varying the phases imparted by phase shifters 1016a, 1016b, and 1016c. FIG. 10C shows a slightly simpler example of a MZI that allows for a variable transmissivity between modes 1012a and 1012b by varying the phase imparted by the phase shifter 1016. FIGS. 10A-10C are only three examples of how one could implement a mode coupling in a physical device, but any type of mode coupling/beam splitter can be used without departing from the scope of the present disclosure.

For example, the waveguide beam splitter in FIG. 10C can be used to switch photons in waveguide 1012a into either waveguide 1012a or 1012b by adjusting the phase of phase shifter 1016b appropriately. Thus, a tunable waveguide beam splitter is a device for mode swapping and optical switching. In addition, these beam splitters, e.g., in a 50:50 configuration can be used to spread the quantum state of a single photon equally across multiple modes (waveguides).

FIG. 12 shows one example of a path encoded system 1200 that corresponds to the system and device described in FIG. 3. The system can be analogously used to generate GHZ states as follows. Advantageously, in the system shown in FIG. 12, for every four Bell states received by the set of 16 qubit inputs, the six qubits in the GHZ state are output with a success probability that is larger than the previous record of 6.25% and more specifically, assuming an ideal system can be as high as 18.75%.

The 16 qubit inputs are shown as inputs (also referred to herein as mode pairs) 308-a1, 308-a2, 308-b1, 308-b2, 308-c1, 308-c2, 308-d1, 308-d2. In the photonic case, the modes can be waveguides already described above. To generate the GHZ state, four (dual rail path encoded) qubit Bell pairs are received in these 18 modes, the photons of each Bell pair occupying a respective group of four of the 16 qubit inputs. For example, one Bell pair is input on pair of inputs 308-a2 and pair of inputs 308a1.

Portions of these Bell pairs are then sent to the interferometer system 1210 that include a number of mode-couplers, also referred to herein a beamsplitters. These mode couplers can be arranged in many different forms other than the one example shown here. More generally, any set of mode-couplers can be used that takes any input mode and spreads it evenly amongst the various output modes. In this case the set of beamsplitters implements (up to a global phase) the 2-qubit imaginary Hadamard described and shown in FIG. 9.

Returning back to the original 16 modes making up the 8 Bell pairs, 4 mode swaps are implemented as shown such that one of the modes form each bell pair are sent into the interferometer system 1120. For example, in FIG. 12, modes 308-a1, 308-b1, 308-c1, and 308-d1 from the first, second, third and fourth Bell pairs are sent to the interferometer system 1210.

As already described above, and reiterated below in reference to Table 1, the device successfully generates a 6-GHZ state when at least two photons are detected in no less than two of the four coupled modes.

More specifically a method for using the device of FIG. 12 for generating a 6-GHZ state include receiving a plurality of qubit pairs, each qubit pair being in a Bell state and including a first qubit and a second qubit that is distinct and separate from the first qubit. The method further includes providing qubits of the plurality of qubit pairs to a plurality of beamsplitters, e.g., beamsplitters 1213a, 1213b, 1213c, 1213d.

More specifically the method further includes providing a first mode of a first qubit pair (e.g., mode 308-a1) as a first input to a first beam splitter (e.g., beamsplitter 1213b) and a first mode of a second qubit (e.g., mode 308-b1) pair as a second input to the first beam splitter, wherein the first beam splitter is coupled with a first output channel (the output channel coupled to detector 1212a) of the first beam splitter and a second output channel (the output channel coupled to detector 1212b) of the first beam splitter.

The method further includes providing a first mode of a third qubit pair (e.g., mode 308-c1) as a first input to a second beam splitter and a first mode of a fourth qubit pair (e.g., 308-d1) as a second input to the second beam splitter (e.g., beamsplitter 1213a) that is distinct from the first beam splitter. In some embodiments, the second beam splitter is coupled with a first output channel of the second beam splitter (e.g., the output channel coupled to detector 1212c) and a second output channel of the second beam splitter (e.g., the output channel coupled to the detector 1212d).

The method further includes providing a qubit output from the first beam splitter in the second output channel of the first beam splitter as a first input to a first detector and a qubit output from the second beam splitter in the first output channel of the second beam splitter as a second input to the first detector. More specifically each of the qubits that are output from the first and second beamsplitters can be further equally spread amongst all four modes of the interferometer such that the probability that any given qubit is output to any of the four detectors 1212a, 1212b, 1212c, 1212d is equal.

Another equivalent way to describe the interferometer system 1210 is as a quantum information (or quantum state scrambling coupler) that erases at its output any information regarding which modes the qubits originated from. Each beamsplitter within the interferometer system 1210 can be a 50/50 beam splitter, like that shown in FIG. 5. The effect of the interferometer system 1210 is that detectors 1212 can detect a photon but cannot identify which waveguide it came from, which in some circumstances is necessary to generate the entanglement of the GHZ state.

In some embodiments, detectors 1212 are coupled to a digital logic module 1211 (e.g., which may be implemented as field programmable digital logic using, for example, a field programmable gate array (FPGA) or an on-chip hardwired circuit, such as an application specific integrated circuit (ASIC)). Alternatively, in some embodiments, the detectors 1212 are coupled to an off-chip classical computer (e.g., classical computer 112, FIG. 1). In some embodiments, the digital logic module 1211 and/or the classical computer receives information from each detector 1212 indicating whether the detector 1212 detected a photon (and optionally how many). Stated another way, the digital logic module 1211 and/or the classical computer receives the detection pattern for a detection operation from the detectors 1212 (e.g., in the form of analog detection signals). The digital logic module 1211 and/or the classical computer executes logic that configures a switch (not shown) to either output the photons, pass the photons to a subsequent stage of the device. In some embodiments, the digital logic module 1211 and/or the classical computer does so by referencing a look-up table (e.g., stored in the memory) to determine whether the detection pattern indicates that the photons remaining in the first set of output waveguides 320 are in the desired GHZ state of if a fusion failure has occurred.

Table 1 below provides an example of the logic performed by the digital logic module 1211 and/or the classical computer. In table 1, a check mark (✓) indicates successful generation of a GHZ state, an "X" indicates a failure. Further, in Table 1, the detection patterns are written, e.g., 1-0-1-0, which means that one photon is detected by a first detector (e.g., detector 1212a); zero photons are detected by a second detector (e.g., detector 1212b); one photon is detected by a third detector (e.g., detector 1212c); and zero photons are detected by a fourth detector (e.g., detector 1212d). "N/A" is used to signify that the stage is unnecessary, and therefore no detection pattern or outcome is obtained for that stage.

TABLE 1

| First Stage Detection Pattern | GHZ Outcome |
|---|---|
| 1-1-0-0 | ✓ |
| 1-1-0-0 | ✓ |
| 0-0-1-1 | ✓ |
| 0-1-0-1 | ✓ |
| 1-0-0-1 | ✓ |
| 0-1-1-0 | ✓ |
| 2-0-0-0 | X |

FIG. 12 is shown as merely one example of how to implement the systems and methods described herein to generate entangled qubits states in the path encoding, specifically the device shown in FIG. 3 that generates a 6 GHZ state from 4 Bell pairs. One of ordinary skill having the benefit of this disclosure will recognize that any of the devices described herein can be similarly implemented in the path encoding.

For the sake of conciseness, the qubits disclosed herein have been described in the context of photonics, i.e., photonic qubits, and can be formed from one or more photons, but other types of qubits are also possible without departing from the scope of the present disclosure. For example, the qubits disclosed herein can be a collection of quantum systems and/or particles and can be formed using any qubit architecture, such as massive particles such as atoms, ions, and/or nuclei. In other examples, the quantum systems can be other engineered quantum systems such as flux qubits, phase qubits, or charge qubits (e.g., formed from a superconducting Josephson junction), topological qubits (e.g., Majorana fermions), or spin qubits formed from vacancy centers (e.g., nitrogen vacancies in diamond). Furthermore, for the sake of clarity of description, the term "qubit" is used herein although the system can also employ quantum information carriers that encode information in a manner that is not necessarily associated with a binary bit. For example, qudits can be used, i.e., quantum systems that can encode information in more than two quantum states in accordance with some embodiments.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

It will also be understood that, although the terms first, second, etc., are, in some instances, used herein to describe various elements, these elements should not be limited by these terms. These terms are only used to distinguish one element from another. For example, a first beam splitter could be termed a second beam splitter, and, similarly, a second beam splitter could be termed a first beam splitter, without departing from the scope of the various described embodiments. The first beam splitter and the second beam splitter are both beam splitters, but they are not the same beam splitter unless explicitly stated as such.

As used herein, the term "if" is, optionally, construed to mean "when" or "upon" or "in response to determining" or "in response to detecting" or "in accordance with a determination that," depending on the context.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
receiving a plurality of photon pairs, each photon pair being in a Bell state and including a first photon and a second photon that is distinct and separate from the first photon; and
obtaining a plurality of photons comprising at least six photons in a Greenberger-Horn-Zeilinger (GHZ) state by:
providing photons of the plurality of photon pairs to a plurality of beam splitters, including:
providing a first photon of a first photon pair as a first input to a first beam splitter and a first photon of a second photon pair as a second input to the first beam splitter, wherein the first beam splitter is coupled with a first output channel of the first beam splitter and a second output channel of the first beam splitter; and
providing a first photon of a third photon pair as a first input to a second beam splitter and a first photon of a fourth photon pair as a second input to the second beam splitter that is distinct from the first beam splitter, wherein the second beam splitter is coupled with a first output channel of the second beam splitter and a second output channel of the second beam splitter; and providing a photon output from the first beam splitter in the second output channel of the first beam splitter as a first input to a first fusion gate and a photon output from the second beam splitter in the first output channel of the second beam splitter as a second input to the first fusion gate.

2. The method of claim 1, wherein:
only one photon is output from the first beam splitter in the second output channel of the first beam splitter; and
only one photon is output from the second beam splitter in the first output channel of the second beam splitter.

3. The method of claim 1, wherein the plurality of photons in the GHZ state includes:
second photons of: the first photon pair, the second photon pair, the third photon pair, and the fourth photon pair.

4. The method of claim 3, wherein:
the plurality of photons in the GHZ state includes:
one photon output from the first beam splitter in the first output channel of the first beam splitter; and
one photon output from the second beam splitter in the second output channel of the second beam splitter.

5. The method of claim 4, wherein the GHZ state is a 6-photon GHZ state produced using 4 pairs of photons in a Bell state.

6. The method of claim 1, further including:
detecting, using the first fusion gate, a first state of the photon provided as the first input to the first fusion gate and a second state of the photon provided as the second input to the first fusion gate; and
determining whether the first state and the second state are indicative of a 6-photon GHZ state.

7. The method of claim 1, wherein:
the first fusion gate includes a first detector and a second detector that is distinct and separate from the first detector; and
the method includes detecting, using the first detector of the first fusion gate, only one photon selected from the photon provided as the first input to the first fusion gate and the photon provided as the second input to the first fusion gate and detecting, using the second detector of the first fusion gate, only another photon selected from the photon provided as the first input to the first fusion gate and the photon provided as the second input to the first fusion gate.

8. The method of claim 1, further including:
providing a first photon of a fifth photon pair as a first input to a third beam splitter and a first photon of a sixth photon pair as a second input to the third beam splitter that is distinct from the first beam splitter and the second beam splitter, wherein the third beam splitter is coupled with a first output channel of the third beam splitter and a second output channel of the third beam splitter; and providing a photon output from the second beam splitter in the second output channel of the second beam splitter as a first input to a second fusion gate and a photon output from the third beam splitter in the first output channel of the third beam splitter as a second input to the second fusion gate.

9. The method of claim 8, wherein:
the plurality of photons in the GHZ state includes:
second photons of: the first photon pair, the second photon pair, the third photon pair, the fourth photon pair, the fifth photon pair, and the sixth photon pair;
one photon output from the first beam splitter in the first output channel of the first beam splitter; and
one photon output from the third beam splitter in the second output channel of the third beam splitter.

10. The method of claim 9, wherein the GHZ state is an 8-photon GHZ state produced using 6 pairs of photons in a Bell state.

11. The method of claim 8, further including:
providing a first photon of a seventh photon pair as a first input to a fourth beam splitter and a first photon of an eighth photon pair as a second input to the fourth beam splitter that is distinct from the first beam splitter, the second beam splitter, and the third beam splitter, wherein the fourth beam splitter is coupled with a first output channel of the fourth beam splitter and a second output channel of the fourth beam splitter; and
providing a photon output from the third beam splitter in the second output channel of the third beam splitter as a first input to a third fusion gate and a photon output from the fourth beam splitter in the first output channel of the fourth beam splitter as a second input to the third fusion gate.

12. The method of claim 11, wherein:
the plurality of photons in the GHZ state includes:
second photons of: the first photon pair, the second photon pair, the third photon pair, the fourth photon pair, the fifth photon pair, the sixth photon pair, the seventh photon pair, and the eighth photon pair;
one photon output from the first beam splitter in the first output channel of the first beam splitter; and
one photon output from the fourth beam splitter in the second output channel of the fourth beam splitter.

13. The method of claim 12, wherein the GHZ state is a 10-photon GHZ state produced using 8 pairs of photons in a Bell state.

14. The method of claim 12, wherein:
the plurality of photons in the GHZ state further includes:
one photon output from the second fusion gate.

15. The method of claim 14, wherein the GHZ state is an 11-photon GHZ state produced using 8 pairs of photons in a Bell state.

16. The method of claim 1, wherein:
the GHZ state is an n-photon GHZ state;
the first fusion gate is a fusion gate in a plurality of fusion gates; and
the method further includes:
detecting, using the plurality of fusion gates, a state of photons provided to the plurality of fusion gates; and
determining whether the state of the photons provided to the plurality of fusion gates is indicative of an n-photon GHZ state.

17. A method, comprising:
receiving a plurality of qubit pairs, each qubit pair being in a Bell state and including a first qubit and a second qubit that is distinct and separate from the first qubit; and
obtaining a plurality of qubits comprising at least six qubits in a Greenberger-Horn-Zeilinger (GHZ) state by:
providing qubits of the plurality of qubit pairs to a plurality of beam splitters, including:
providing a first mode of a first qubit pair as a first input to a first beam splitter and a first mode of a second qubit pair as a second input to the first beam splitter, wherein the first beam splitter is coupled with a first output channel of the first beam splitter and a second output channel of the first beam splitter; and providing a first mode of a third qubit pair as a first input to a second beam splitter and a first mode of a fourth qubit pair as a second input to the second beam splitter that is distinct from the first beam splitter, wherein the second beam splitter is coupled with a first output channel of the second beam splitter and a second output channel of the second beam splitter; and providing a mode output from the first beam splitter in the second output channel of the first beam splitter as a first input to a first detector and a mode output from the second beam splitter in the first output channel of the second beam splitter as a second input to the first detector.

18. The method of claim 17, wherein:
only one qubit is output from the first beam splitter in the second output channel of the first beam splitter; and
only one qubit is output from the second beam splitter in the first output channel of the second beam splitter.

19. The method of claim 17, wherein the plurality of qubits in the GHZ state includes:
second qubits of: the first qubit pair, the second qubit pair, the third qubit pair, and the fourth qubit pair.

20. The method of claim 19, wherein:
the plurality of qubits in the GHZ state includes:
one qubit output from the first beam splitter in the first output channel of the first beam splitter; and
one qubit output from the second beam splitter in the second output channel of the second beam splitter.

21. The method of claim 20, wherein the GHZ state is a 6-qubit GHZ state produced using 4 pairs of qubits in a Bell state.

22. The method of claim 17, further including:
detecting, using the first detector, a first state of the qubit provided as the first input to the first detector and a second state of the qubit provided as the second input to the first detector; and
determining whether the first state and the second state are indicative of a 6-qubit GHZ state.

23. The method of claim 17, wherein:
the first detector includes a first detector and a second detector that is distinct and separate from the first detector; and
the method includes detecting, using the first detector of the first detector, only one qubit selected from the qubit provided as the first input to the first detector and the qubit provided as the second input to the first detector and detecting, using the second detector of the first detector, only another qubit selected from the qubit provided as the first input to the first detector and the qubit provided as the second input to the first detector.

24. The method of claim 17, further including:
providing a first mode of a fifth qubit pair as a first input to a third beam splitter and a first mode of a sixth qubit pair as a second input to the third beam splitter that is distinct from the first beam splitter and the second beam splitter, wherein the third beam splitter is coupled with a first output channel of the third beam splitter and a second output channel of the third beam splitter; and
providing a qubit output from the second beam splitter in the second output channel of the second beam splitter as a first input to a second detector and a qubit output from the third beam splitter in the first output channel of the third beam splitter as a second input to the second detector.

25. The method of claim 24, wherein:
the plurality of qubits in the GHZ state includes:
second qubits of: the first qubit pair, the second qubit pair, the third qubit pair, the fourth qubit pair, the fifth qubit pair, and the sixth qubit pair;
one qubit output from the first beam splitter in the first output channel of the first beam splitter; and
one qubit output from the third beam splitter in the second output channel of the third beam splitter.

26. The method of claim 25, wherein the GHZ state is an 8-qubit GHZ state produced using 6 pairs of qubits in a Bell state.

27. The method of claim 24, further including:
providing a first mode of a seventh qubit pair as a first input to a fourth beam splitter and a first mode of an eighth qubit pair as a second input to the fourth beam splitter that is distinct from the first beam splitter, the second beam splitter, and the third beam splitter, wherein the fourth beam splitter is coupled with a first output channel of the fourth beam splitter and a second output channel of the fourth beam splitter; and
providing a qubit output from the third beam splitter in the second output channel of the third beam splitter as a first input to a third detector and a qubit output from the fourth beam splitter in the first output channel of the fourth beam splitter as a second input to the third detector.

28. The method of claim 27, wherein:
the plurality of qubits in the GHZ state includes:
second qubits of: the first qubit pair, the second qubit pair, the third qubit pair, the fourth qubit pair, the fifth qubit pair, the sixth qubit pair, the seventh qubit pair, and the eighth qubit pair;
one qubit output from the first beam splitter in the first output channel of the first beam splitter; and
one qubit output from the fourth beam splitter in the second output channel of the fourth beam splitter.

29. The method of claim 28, wherein the GHZ state is a 10-qubit GHZ state produced using 8 pairs of qubits in a Bell state.

30. The method of claim 28, wherein:
the plurality of qubits in the GHZ state further includes:
one qubit output from the second detector.

31. The method of claim 28, wherein the GHZ state is an 11-qubit GHZ state produced using 8 pairs of qubits in a Bell state.

32. The method of claim 17, wherein:
the GHZ state is an n-qubit GHZ state;
the first detector is a detector in a plurality of detectors; and
the method further includes:
detecting, using the plurality of detectors, a state of qubits provided to the plurality of detectors; and
determining whether the state of the qubits provided to the plurality of detectors is indicative of an n-qubit GHZ state.

33. A method, comprising:
receiving, by a set of 16 qubit inputs, four qubit pairs, each qubit pair being in a Bell state and each Bell state including respective four of the 16 qubit inputs;
coupling four modes, one from each of the four pairs of Bell states;
detecting at least two photons in no less than two of the four coupled modes; and outputting, on a subset of 12 of 16 waveguides, a plurality of qubits comprising at least six qubits in a Greenberger-Horn-Zeilinger (GHZ) state.

34. The method of claim 33, wherein for every four Bell states received by the set of 16 qubit inputs, the six qubits in the GHZ state is output with a success probability that is larger than 6.25% and smaller than 18.75%.

* * * * *